US009957074B2

(12) United States Patent
Petri et al.

(10) Patent No.: US 9,957,074 B2
(45) Date of Patent: May 1, 2018

(54) METHOD OF CONTROLLING A RATE AT WHICH AN UPSTREAM PROCESS FEEDS A CONDITIONED PRODUCT TO A DOWNSTREAM PROCESS

(71) Applicant: Heat and Control, Inc., Flower Mound, TX (US)

(72) Inventors: Kenneth C. Petri, Richardson, TX (US); Richard Rees, Arlington, TX (US)

(73) Assignee: Heat & Control, Inc., Flower Mound, TX (US)

( * ) Notice: Subject to any disclaimer, the term of this patent is extended or adjusted under 35 U.S.C. 154(b) by 276 days.

(21) Appl. No.: 15/000,735

(22) Filed: Jan. 19, 2016

(65) Prior Publication Data

US 2016/0207657 A1      Jul. 21, 2016

Related U.S. Application Data

(60) Provisional application No. 62/104,515, filed on Jan. 16, 2015.

(51) Int. Cl.
| | |
|---|---|
| *G01G 11/08* | (2006.01) |
| *B65B 57/14* | (2006.01) |
| *B65B 35/10* | (2006.01) |
| *G01G 13/24* | (2006.01) |

(52) U.S. Cl.
CPC .............. *B65B 57/14* (2013.01); *B65B 35/10* (2013.01); *G01G 11/08* (2013.01); *G01G 13/248* (2013.01)

(58) Field of Classification Search
USPC ......................................................... 700/305
See application file for complete search history.

(56) References Cited

U.S. PATENT DOCUMENTS

| | | | | | |
|---|---|---|---|---|---|
| 4,615,403 | A | * | 10/1986 | Nakamura | ............. G01G 11/12 177/121 |
| 4,627,576 | A | * | 12/1986 | Hahn | ...................... B07B 13/18 241/24.1 |

(Continued)

FOREIGN PATENT DOCUMENTS

EP           0152923 A2      8/1985

OTHER PUBLICATIONS

International Searching Authority (ISA); International Search Report and Written Opinion; dated May 20, 2016.

(Continued)

*Primary Examiner* — Robert Fennema
*Assistant Examiner* — Rajendra Khadka
(74) *Attorney, Agent, or Firm* — Patrick K. Steele

(57) ABSTRACT

A method of controlling an upstream and a downstream process wherein the upstream process conditions a stream of product delivered to the downstream process is provided. The control method uses an empirically determined formula to determine a metric for adjusting the activity of the upstream process to thereby adjust the rate with which the upstream process conditions and feeds a stream of conditioned product to the downstream process. The empirically determined formula determines the metric using two input variables: a duty cycle setting of the upstream process and an output rate of the downstream process expressed as a decimal amount of the output rate set-point.

15 Claims, 14 Drawing Sheets

(56) References Cited

U.S. PATENT DOCUMENTS

| | | | | |
|---|---|---|---|---|
| 5,479,756 A * | 1/1996 | Haze | | B65B 57/00 340/3.2 |
| 6,502,013 B1 * | 12/2002 | Sosnik | | G01G 13/06 177/116 |
| 6,588,363 B1 * | 7/2003 | Burke | | A23P 20/18 118/13 |
| 6,848,568 B1 * | 2/2005 | Nibler | | B65G 27/34 198/502.2 |
| 6,863,913 B1 * | 3/2005 | Navin | | B65B 1/44 141/102 |
| 7,055,455 B2 * | 6/2006 | Burke | | A23P 20/18 118/13 |
| 7,137,325 B2 * | 11/2006 | Bajema | | B26D 1/0006 83/369 |
| 7,593,830 B2 * | 9/2009 | Stanton | | B29B 7/603 141/13 |
| 2005/0155978 A1 * | 7/2005 | Parets | | B65B 37/18 222/1 |
| 2006/0141107 A1 * | 6/2006 | Schwimmer | | A23C 19/0765 426/231 |
| 2006/0180357 A1 * | 8/2006 | Timings | | G01G 15/00 177/50 |
| 2007/0129843 A1 * | 6/2007 | Lupton | | B07C 5/36 700/223 |
| 2007/0261855 A1 | 11/2007 | Brunet et al. | | |
| 2007/0269565 A9 * | 11/2007 | Yakushigawa | | A23P 20/18 426/519 |
| 2010/0005760 A1 * | 1/2010 | Matheyka | | B65B 55/08 53/426 |
| 2011/0072764 A1 * | 3/2011 | Daniek | | B26D 7/2614 53/556 |
| 2012/0067451 A1 * | 3/2012 | Malenke | | B65B 1/36 141/1 |
| 2013/0239525 A1 * | 9/2013 | Hammacher | | B65B 5/068 53/473 |
| 2013/0248325 A1 * | 9/2013 | Michler | | B65G 47/682 198/379 |
| 2015/0239677 A1 * | 8/2015 | Svejkovsky | | B65G 27/16 198/360 |

OTHER PUBLICATIONS

International Search Report and the Written Opinion of the International Searching Authority; (ISA) International Searching Authority; dated May 20, 2016.

* cited by examiner

```
                306                              307
Bucket  Weight  ↙              Bucket  Weight    ↙
  1     13.1                     1     13.1
  2     12.4   ←301              2     12.4   ←303
  3     10.2  ↙                  3     10.6  ↙
  4      9.2                     4      9.2
  5     14.8   ←302              5     14.8
  6     15    ↙                  6     15     ←304
  7      8.2                     7      8.2   ←305
  8      6.7                     8      6.7  ↙
```

FIG. 17

```
                                          308
Bag  Weight   Time                        ↙
 1   25.21   32:45:41  ⎫
 2   25.36   32:45:42  ⎪
 3   25.48   32:45:42  ⎪
 4   25.01   32:45:43  ⎪
 5   25.14   32:45:43  ⎪
 6   25.27   32:45:44  ⎪                  309
 7   25.21   32:45:45  ⎪                   ↙
 8   25.09   32:45:45  ⎬         ┌─────────────────┐
 9   25.48   32:45:46  ⎪         │ Σ = 429.36g     │
10   25.44   32:45:46  ⎪         │ Δt = 10 seconds │
11   25.15   32:45:47  ⎪         └─────────────────┘
12   25.20   32:45:48  ⎪
13   25.25   32:45:48  ⎪                   ↖
14   25.31   32:45:49  ⎪                   310
15   25.51   32:45:49  ⎪
16   25.17   32:45:50  ⎪
17   25.08   32:45:51  ⎭
18   25.19   32:45:51
19   25.28   32:45:52
20   25.11   32:45:52
       ↑        ↑
      311      312
```

FIG. 18

METHOD OF CONTROLLING A RATE AT WHICH AN UPSTREAM PROCESS FEEDS A CONDITIONED PRODUCT TO A DOWNSTREAM PROCESS

STATEMENT OF RELATED APPLICATIONS

This application depends from and claims priority to U.S. Provisional Application No. 62/104,515 filed on Jan. 16, 2015.

BACKGROUND

Field of the Invention

The present invention relates to a method of controlling the rate at which a stream of a product, consisting of a large plurality of individual portions or pieces, is fed by an upstream process that conditions the stream of product to a downstream process that either further conditions the stream of product or weighs and packages the stream of product. More specifically, the present invention relates to a method of harmonizing the control of the upstream process and an associated downstream process.

Background of the Related Art

Many products are mass produced in a facility with sequential processes to step-wise condition, weigh and package the products. An upstream process conditions the products and feeds a stream of conditioned products to a downstream process in which the products are either further conditioned or weighed and packaged. Automation of the processes may, if done correctly, maximize production and product quality.

Continuous operation of the downstream process at or near a desired rate setting requires that the upstream process must at least meet, and preferably slightly exceed, the demand rate for conditioned products required by the downstream process. This operational mode sustains the desired rate of product output. The downstream process can only process the conditioned products that are delivered by the upstream process. Given this dependent relationship between the downstream process and the upstream process, the harmonization of control of the facility requires that the upstream process be operated at a rate that meets or exceeds the demand requirement of the downstream process.

Those knowledgeable of control methods will understand that precisely matching the throughput rate of two independently-operated and sequential processes is extremely difficult. Either the rate of throughput of the downstream process will exceed the rate at which conditioned product is delivered by the upstream process, thus requiring occasional interruptions in the downstream process to allow the upstream process to "catch up," or the rate at which conditioned product is delivered by the upstream process will exceed the rate at which the downstream process can accept and process conditioned product, thus requiring interruptions in the upstream process to prevent unwanted accumulation of conditioned product. In many processes, this latter mode of operation is problematic if stopping and restarting the upstream process results in a loss of quality control of the conditioned product produced by the upstream process. In this case, an operator using conventional control processes is put in the position of having to choose between achieving the desired rate of production and maintaining of the quality of the product. This conflict gives rise to the need for a control method that serves to automatically monitor performance indicating variables and equipment settings of the upstream and the downstream processes and to automatically adjust equipment settings to achieve the desired rate of production without sacrificing product quality.

There are many types of processes that include equipment that cannot be instantly stopped and later restarted without affecting the quality of the product being conditioned. For example, but not by way of limitation, if the upstream process includes the use of an electrical resistance heating element and the related application of heat to a stream of product by activation of the heating element, a time interval is required for the heating element to cool from the normal operating temperature to an inactive state. During this interval of "cooling time," the portion of the product stream exposed to the heating element will continue to be heated at a diminishing rate of heat transfer after the electrical current to the heating element is interrupted. Similarly, upon restarting of the upstream process, the heating element requires a time interval to warm from an inactive state to a normal operating temperature. During this interval of time, the portion of the product stream exposed to the heating element will be heated at an increasing rate, but will initially be heated at a temperature that is substantially less than the normal operating temperature of the heating element until the heating elements reach the normal operating temperature. A portion of the product stream that is exposed to this interruption of conditioning by the heating element in the upstream process will be of a different quality than other portions of the product stream that are conditioned by the heating element operating at a steady state.

Another example of a scenario involving an upstream process that feeds conditioned product to a downstream process, and one in which the interruption of an upstream process impairs the quality of a portion of the stream of product, involves the application of a sprinkled or sprayed additive material to the stream of product. The sprinkled or sprayed material may be a coating or a flavoring agent, such as a seasoning material. For example, but not by way of limitation, a stream of product consisting of a large plurality of individual food portions may be conditioned in an upstream process by controlled application of a seasoning material. During steady state operation of the upstream process, the seasoning material is dispensed at a controlled rate—that yields optimal results—onto a product stream moving underneath a seasoning dispenser. As with the heating element in the prior example, stopping and restarting the seasoning material dispenser of the upstream process impairs the quality of the portion of the product stream that is below the seasoning dispenser at the time at which the dispenser is stopped and then later restarted. The rate at which the seasoning material is applied to that affected portion of the product stream will vary, and quality will be compromised. Too little seasoning material per unit of the seasoned product or too much seasoning material per unit of the seasoned product will result in an unwanted variance of flavor of the product and an undesirable loss of consumer satisfaction.

What is needed is a control method for efficiently operating an upstream process, that conditions a stream of product, and a downstream process, that receives and either further processes the conditioned product stream from the upstream process or weighs and packages the conditioned product stream from the upstream process, and where the upstream process is one in which interruptions in conditioning operation impairs product quality and the downstream process is one in which interruptions in operation impairs the rate of production.

BRIEF SUMMARY

Embodiments of the control method of the present invention can be used to harmonize control of an independently-controlled upstream process that conditions a stream of product and feeds that conditioned stream of product to an independently-controlled downstream process that one of further conditions the stream of product and weighs and packages the product into discrete and predetermined amounts.

One embodiment of the control method of the present invention monitors the performance of the upstream process and the downstream process, and modulates the upstream process in a manner that satisfies the feed rate requirement at which the downstream process can efficiently receive and further conditions or weigh and package the stream of conditioned product delivered by the upstream process, and the modulation of the upstream process can be implemented with minimal impact on the quality of the conditioned product delivered by the upstream process.

One embodiment of the control method of the present invention includes the steps of monitoring the output of the downstream process to determine the actual production within a predetermined time interval, comparing the actual production of the downstream process with the rate setting on the downstream process to determine a performance indicating variable for the downstream process, monitoring the duty cycle of the upstream process to determine the proportion of the time interval during which the upstream process is actively conditioning product to be fed to the downstream process, and using these measured variables to determine a metric that can be used to adjust the rate at which unconditioned product is fed to the upstream process to better satisfy the feed requirement of the downstream process while minimizing interruptions in the upstream process.

Embodiments of the control method of the present invention are adapted to maximize the rate of production of the facility that includes the upstream process and the downstream process while maintaining a high level of quality of the final product, to operate the upstream process to slightly overfeed the downstream process and, at the same time, to minimize the stopping and restarting of the upstream process in a manner that prevents excessive accumulation of conditioned product.

Embodiments of the control method of the present invention use two critical performance indicating variables, one relating to the production rate and also to the production setting of the downstream process, and one relating to the quality of the conditioned product from the upstream process. The production rate of the downstream process is measured by the number of packages or bags of product produced by the downstream process, each package or bag containing a known and predetermined mass of the product. The quality of the product received into the downstream bagging process from the upstream process is determined by the duty cycle of the upstream process; that is, the percentage of a given time interval that the upstream process remains active and uninterrupted. These two critical performance indicating variables are used in an empirical formula that determines a metric than can be used to adjust the duty cycle for the upstream process in a manner that will continue to satisfy the conditioned product feed requirement of the downstream process while, at the same time, minimizing the frequency and duration of periods of inactivity of the upstream process that result from stopping and restarting the upstream process to prevent unwanted conditioned product accumulation.

The discussion that follows uses the term "duty cycle," often abbreviated as "DC," to refer to the proportion of active time of operation of the upstream process during a selected time interval, and the discussion that follows uses the phrase "bags per minute," abbreviated as "BPM," to refer to the measured rate of production of the downstream process. The rate of production, or BPM, is the rate at which the upstream process and the downstream process, acting together as a system, produce the end product.

Conventional control methods perform well under one set of circumstances, but underperform under another set of circumstances for which the conventional control method are not adapted. By placing priority on the rate of production, embodiments of the control method of the present invention are adapted to correct both an underfed and an excessively overfed situation by determining and providing a revised duty cycle at which the upstream process should be operated to satisfy the feed requirement of conditioned product of the downstream process while maintaining optimal quality of the conditioned product delivered to the downstream process by the upstream process.

The actual bags per minute produced, or $BPM_{ACTUAL}$, is the production rate of the downstream process that weighs and bags the product. $BPM_{ACTUAL}$ is determined by measuring the bags of product produced during a given time interval. It will be understood that the mass flow rate of the weighing and bagging process can be determined by multiplying the $BPM_{ACTUAL}$ by the weight of product that is placed in each bag, or by weighing the product as it is directed to the bagging stage. A weighing and bagging machine includes an input set point, $BPM_{SP}$, which is the rate at which the machine will produce bags of product if the weighing and bagging machine is operating properly and if the rate at which the upstream process delivers conditioned product to the downstream process is sufficient. Dividing the $BPM_{ACTUAL}$ by the rate at which the weighing and bagging machine is set to operate, $BPM_{SP}$, provides a performance indicating variable reflecting the efficiency with which the downstream process operates, or $BPM_{RATIO}$. Stated as an equation, $BPM_{RATIO} = BPM_{ACTUAL}/BPM_{SP}$, and this is the performance indicating variable for the downstream process in which the conditioned product delivered by the upstream process is either further conditioned or weighed and bagged.

The $DC_{ACTUAL}$ is the percentage of a given time period that the upstream cycle, which in our example is a seasoning station, actively dispenses seasoning onto raw product during the same time interval used in the determination of $BPM_{RATIO}$. The revised duty cycle, referred to herein as the metric, is a new setting for the upstream process that will harmonize operation of the upstream and downstream process. The metric is a function of: 1) the efficiency of the downstream process, $BPM_{RATIO}$, and 2) the duty cycle for the upstream process, $DC_{ACTUAL}$. The metric, which is the new rate setting for the upstream process, is obtained using an empirical equation that corrects the duty cycle of the upstream process in a manner that moves the duty cycle closer to unity, meaning that it minimizes the frequency and duration of inactivity of the upstream process, and adjusts the rate at which conditioned product is delivered by the upstream process to be closer to the set-point output rate of the downstream process, $BPM_{SP}$.

It should be noted that the ideal operating mode is when the duty cycle, $DC_{ACTUAL}$, and the efficiency of the downstream process, $BPM_{RATIO}$, are both equal to one. This is an ideal condition in which the upstream process is operated with zero inactivity during a given time interval while, at the same time, the downstream process is not hindered by having a feed rate of conditioned product from the upstream process that is below the rate of conditioned product delivery needed for operating the downstream process at the set point, $BPM_{SP}$.

While the embodiment of the control method of the present invention that is described below relates to a facility for processing and then weighing and packaging a food product consists of a large plurality of individual food portions, embodiments of the control method of the present invention may be used in other applications where an upstream process feeds a conditioned product stream to a downstream process that either further conditions the product stream or it weighs and packages the product stream. Embodiments of the control method of the present invention maximize the efficiency of a product processing operation in which an upstream process feeds conditioned product to a downstream process. The detailed description of an actual application of an embodiment of the control method as applied to a food processing operation should not be construed as limiting of the scope of the control method of the present invention, which is limited only by the appended claims.

To provide an understanding of the type and nature of a facility in which embodiments of the control method of the present invention may be used to improve efficiency and maintain quality, a description of the product flow system of a food processing facility is provided. A section of the facility may be used to prepare and cook a food product. For example, a facility used to make potato chips or other prepared foodstuff may include a preparation and cooking section in which the raw product such as, for example, potatoes, are skinned, sliced and then cooked in a fryer. A distribution conveyor moves the prepared and cooked stream of product from the preparation and cooking section to a conditioning, weighing and packaging section in which a stream of the raw product, skinned, sliced and fried chips, is conditioned by a process such as, for example, flavored with a sprinkled seasoning material, and subsequently weighed and packaged.

It will be understood that an adjustable gate or other flow control valve such as, for example, those disclosed in U.S. Pat. No. 6,119,849 to Svejkovsky and U.S. Pat. No. 6,378,688 also Svejkovsky, is needed to implement embodiments of the control method of the present invention because a flow control valve enables the rate at which the raw product to be fed to the upstream process to be either increased or decreased by a desired amount. A flow control valve, such as an adjustable gate, is one that can be included within a distribution conveyor to divert a portion of the stream of raw product moved along the distribution conveyor from the distribution conveyor and to an upstream process that conditions the product stream and then delivers conditioned product to a downstream process.

The flow control valve disclosed herein is compatible with reciprocating conveyors that move a stream of raw product along a smooth conveyor surface by asymmetric reciprocation; that is, the conveyor moves at a first rate of acceleration in a first direction, which is the direction of desired movement of the stream of raw product being moved on the conveyor, and the conveyor then moves at a second, greater rate of acceleration, in the opposite direction, to return the conveyor to the original position. The raw product supported on the conveyor generally moves with the conveyor surface in the first direction, and then slips on the conveyor surface due to an insufficient coefficient of static friction when the conveyor surface is moved at the greater rate of acceleration in the opposite direction. The net result is that the stream of raw product supported on the conveyor surface of a reciprocating conveyor is moved along the conveyor surface in the first direction by the asymmetrical reciprocation of the conveyor. It will be understood that the term "asymmetrical," as used herein, refers to the absolute value of the rate of acceleration of the conveyor surface, not to the displacement distance through which the conveyor surface translates during reciprocation.

After a fraction of the stream of raw product moved on the distribution conveyor is discharged from the distribution conveyor using a flow control valve, a receiving conveyor moves the discharged stream of raw or unconditioned product (which may be a fraction of the stream of raw product entering the flow control valve on the distribution conveyor) from the distribution conveyor to a receiving conveyor that feeds the upstream process in which the product is conditioned. Conditioned product from the upstream process is then moved on a conveyor to the downstream process that further conditions or weighs and packages the conditioned product. In the application of an embodiment of a control method of the present invention that is described below, the upstream process is a conditioning process in which a seasoning material is applied to the stream of product discharged from the distribution conveyor, and the downstream process is a weighing and bagging machine. However, it should be understood that embodiments of the control method may be used in other contexts with similar control challenges.

It will be understood that the receiving conveyor that receives and moves the product discharged from the distribution conveyor using a flow control valve may be the same type of reciprocating conveyor as the distribution conveyor. The upstream process, the seasoning system, may include a reciprocating and rotating tumble drum that disturbs and mixes seasoning material dispensed onto the stream of raw product with the raw product. A tumble drum generally reciprocates, in the same asymmetric mode as a reciprocating conveyor, as it rotates to turn and disturb the product. The raw product discharged from the distribution conveyor enters the tumble drum of the seasoning system at an inlet, the seasoning material dispenser deposits seasoning material at a controlled rate onto the stream of raw product as it moves through the tumble drum and, after mixing of the raw product with the dispensed seasoning material, a stream of conditioned product is discharged from an outlet of the tumble drum. The tumble drum may discharge the seasoned product directly onto a dispersion surface intermediate the upstream process and the downstream process or to a reciprocating conveyor that moves the conditioned product to the dispersion surface intermediate the upstream process and the downstream process.

Understanding embodiments of the control method of the present invention is benefited by consideration of conventional control methods. In a conventionally controlled facility, a dispersion surface that feeds the downstream process, for example, a weighing and bagging machine, receives a stream of conditioned (seasoned) product from the upstream process, for example, a seasoning station. The dispersion surface includes a sensor to detect a rate at which the product is delivered from the upstream process onto the dispersion surface. The dispersion surface sensor generates a signal corresponding to the rate at which the product is delivered onto the dispersion surface, and that signal is routed to a processor that, in turn, generates a signal to the flow control valve of the distribution conveyor. The conventional control method is simple: when the level of conditioned product impinging on the dispersion surface of the downstream process falls below a desired level, a signal is generated to call for an increase in the rate at which the conditioned product is delivered, and the flow control valve included within the distribution conveyor that delivers product to the upstream process is adjusted to increase the rate at which product is discharged from the distribution conveyor to the upstream process for conditioning. This adjustment of the adjustable gate increases the flow rate of product to the dispersion surface at the beginning of the downstream process. In this manner, the downstream process maintains a sufficient feed rate of the conditioned product from the upstream process to sustain continued and uninterrupted operation of the downstream process machinery such as, for example, a weighing and bagging machine. The objective of the conventional control method is to control the rate at which product is fed to the dispersion surface of the downstream process so that unwanted interruptions of the downstream process can be avoided while, at the same time, interruptions of the operation of the upstream process can be infrequent. In one conventional control method, the sensor that detects the rate at which conditioned product is delivered to the dispersion surface is a load cell coupled intermediate the dispersion surface and a dispersion surface support member. The weight of the dispersion surface is known, and the force imparted to the dispersion surface by the impingement of conditioned product delivered by the upstream process is measured and a corresponding signal is generated by the load cell. If more or less conditioned product is needed, a suitable signal is generated by the load cell and used by the processor to control the rate at which product is delivered to the upstream process and the rate at which conditioned product is delivered to the dispersion surface.

One specific type of dispersion surface that can be used to feed a downstream process such as, for example, a weighing and bagging machine, is called a dispersion cone. A dispersion cone is a conically-shaped dispersion surface onto which a stream of seasoned product can be deposited for feeding to the downstream process as the product descends off a circumferential edge disposed about the dispersion cone. The dispersion cone may be vibrated to promote sliding of the product in multiple directions off the dispersion cone. The dispersion cone assists with the smooth circumferential distribution of conditioned product due to the downwardly sloped (conical) surface. In a downstream process that weighs and bags the product, the dispersed product slides off the dispersion surface and into a plurality of circumferentially arranged buckets distributed about and below the edges of the dispersion surface. These buckets are parts of the weighing and bagging machine, and each bucket includes a load cell coupled to the bucket to measure the weight of the product residing in the bucket at any given time, and to generate a signal corresponding to the weight of the accumulated product in the bucket to a processor. The processor receives signals from each load cell that provides the weight of product in the associated bucket, and the processor selects a combination of buckets that together contain an amount of seasoned product that falls within a predetermined weight range for a bag of product. Once a combination of buckets that satisfy this predetermined weight range are identified, the processor sends actuating signals to actuators coupled to dump doors on the selected combination of buckets. The actuated dump doors together dump the product from the selected combination of buckets into a waiting bag, which is then sealed and discharged from the weighing and bagging machine.

It will be understood that weighing and bagging machines are available that can meet or exceed one hundred bags per minute with accuracy within 1 to 2% of the targeted weight of product to be deposited in each bag. It will be understood that weighing and bagging machines of this type are known in the prior art and may be used in systems controlled using embodiments of the control method of the present invention.

The shortcoming of the use of conventional control methods to monitor the dispersion surface of the downstream process results from unwanted accumulation of the conditioning material such as, for example, seasoning and crumbs, from a conditioned product moving across the dispersion surface. The accumulated material adheres to and builds up on the dispersion surface and impairs the capacity of the load cell coupled to the dispersion surface to accurately determine the rate at which conditioned product is delivered to the dispersion surface. The resulting error causes the load cell to detect an artificially elevated rate of seasoned product delivered to the dispersion surface and, as a result, to generate a signal to the processor that indicates a higher rate of delivery of conditioned product to the dispersion surface than is actually provided. This erroneous rate measurement causes the processor to reduce the rate at which raw product is discharged from the distribution conveyor to the upstream process such as, for example, a seasoning system, and that, in turn, reduces the rate at which the conditioned product is delivered to the downstream process, such as a weighing and bagging machine. As a result, the downstream process is starved of product and falls short of the rate setting.

The dispersion surface of the downstream process can be periodically cleaned by attending personnel to restore the reliability of the conventional control method, but seasoning material and crumbs quickly begin to re-accumulate on the dispersion surface as a steady stream of seasoned product moves onto and off of the dispersion surface to supply the weighing and bagging machine.

BRIEF DESCRIPTION OF THE SEVERAL VIEWS OF THE DRAWINGS

FIG. 17 is a pair of tables illustrating how a processor used to implement an embodiment of the control method of the present invention may select a combination of buckets of the weighing and bagging machine that together satisfy the weight of product required for a single bag.

FIG. 18 is a table illustrating how a processor used to implement an embodiment of the control method of the present invention can determine the rate at which the conditioned product is weighed and packaged in either bags per minute or kg/minute.

DETAILED DESCRIPTION

Figure 1:
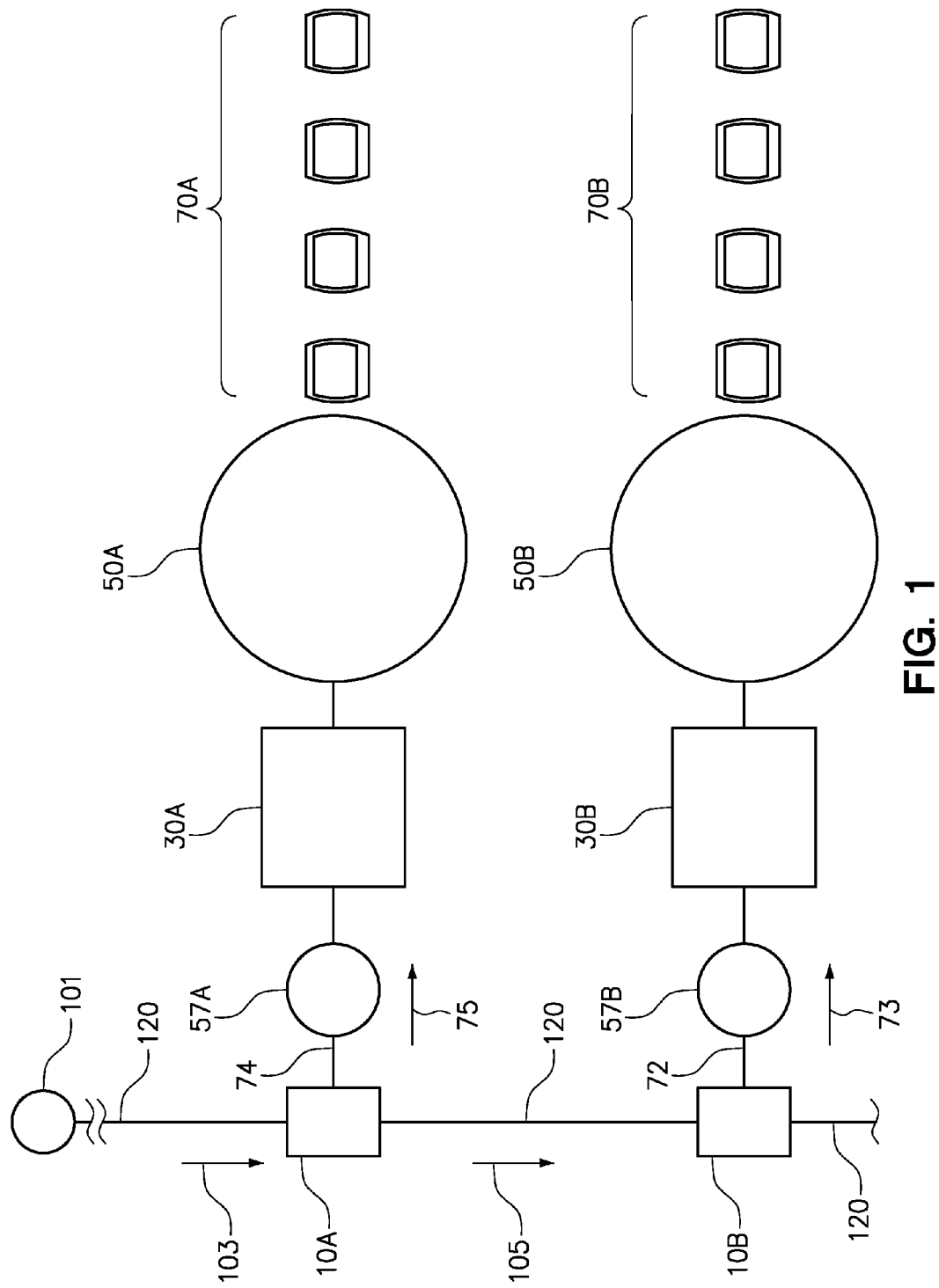
FIG. 1 is a schematic illustrating the layout of a facility having a distribution conveyor and two receiving conveyors branching from the distribution conveyor, each to feed an upstream process that, in turn, feeds a downstream process.

Embodiments of the control method of the present invention provide for controlling the rate at which a stream of product is fed to an upstream process that conditions the stream of product and delivers a stream of conditioned product to a downstream process. A specific embodiment of the control method of the present invention provides for controlling the rate at which unseasoned (or raw) product is discharged from a distribution conveyor to a seasoning system (upstream process) that delivers a stream of seasoned product to a weighing and bagging machine (downstream process). Embodiments of the control method of the present invention use an input signal that is independent of and unaffected by equipment fouling such as, for example, seasoning build-up or accumulation on a dispersion surface that feeds product conditioned in the upstream process to a downstream process such as, for example, a weighing and bagging machine. Embodiments of the control method of the present invention utilize a first signal that indicates the efficiency with which the downstream process, such as a weighing and bagging machine, operates and a second signal that indicates the duty cycle at which the upstream process such as, for example, a product seasoning system, operates. Embodiments of the control method of the present invention provide for adjustments in the duty cycle of the upstream process, which may be a seasoning system, to obtain a favorable balance between the two critical parameters: production rate and product quality.

It is critical to the objectives of maximizing production from the downstream process while simultaneously maintaining quality of the product by careful control of the upstream process. For example, wherein the downstream process is a weighing and bagging machine and the associated upstream process is a product seasoning station, embodiments of the control method of the present invention may be used to maintain high quality and uniformity of conditioned product delivered to a the weighing and bagging machine from the seasoning station while operating the upstream process in a manner that avoids starving the weighing and bagging machine. For reasons given above and related to conventional control methods, achieving this objective requires the use of a more reliable input signal to control the rate at which an unseasoned product stream is fed from a distribution conveyor to the seasoning system that delivers conditioned product stream to the downstream process.

The rate at which the upstream process, which is, in our example, a seasoning station, applies seasoning material to the stream of raw product may be controlled using embodiments of the control method of the present invention. Various devices are known for dispensing the seasoning material onto the stream of product that moves through the seasoning station. The seasoning material is applied to the stream of product at a predetermined application rate that may be, for example, between 0.5 and 12 percent of the weight of the stream of product. It will be understood that some seasoning materials are applied more generously, while other seasoning material are applied less generously to obtain a quality and taste that is acceptable to the consumer.

Embodiments of the control method of the present invention place priority on achieving a set amount of production from the downstream process which is, in our specific embodiment used as an example, a weighing and bagging machine. This requires that the weighing and bagging machine never be starved of seasoned product at the dispersion surface, and this requires that the upstream process, which includes the seasoning station, at least slightly overfeed the downstream process. In order to overfeed a downstream process, the upstream process must be operated at a throughput rate that at least slightly exceeds that of the downstream process. This mode of operation will require intermittent deactivation of the upstream process to keep seasoned or conditioned product from excessively accumulating in the dispersion surface that feeds the downstream process. However, there is a significant incentive to minimize the stopping and restarting of the upstream process due to the impact on quality of the conditioned product delivered to the downstream process.

The seasoning applicator of the seasoning station is, like the electrical resistance heating element discussed above for a different type of upstream process, a process that, by its nature, produces inconsistent results due to a time lag in going from actively dispensing mode to a fully inactive mode, and in later going from an inactive mode to an actively dispensing mode. For a seasoning material that is dispensed from a seasoning dispenser and dropped or sprinkled onto the stream of products as it moves through the seasoning station and underneath the dispenser, the time lag can result from, among other things, the dropping of seasoning material immediately prior to the onset of deactivation of the seasoning dispenser. At the moment of deactivation of the seasoning system, some seasoning material is already dispensed and is falling towards the stream of product. Similarly, upon reactivation of the seasoning system, the stream of product will immediately begin to move through the seasoning station as seasoning material begins to fall towards the stream of product. The result of stopping and restarting the seasoning station is that portions of the product stream affected by the stopping and restarting of the seasoning dispenser are either over-seasoned or under-seasoned, just as the stopping and restarting of the heating element caused affected product to be over-heated or under-heated. For this reason, maximizing the duty cycle of the seasoning station by minimizing the need for stopping and restarting the seasoning system provides for improved quality of the final product.

A distribution conveyor can be used to move a stream of product from a preparation and cooking section of a facility to a conditioning, weighing and packaging section of the facility, and to distribute a fraction of the product stream to each of a plurality of receiving conveyors that branch off from the distribution conveyor. The distribution conveyor is equipped with a plurality of flow control valves, such as in-line adjustable gates, that enable an operator, or a processor programmed and used by the operator, to adjust the fractions of a stream of product moved into a flow control valve on the distribution conveyor that is discharged from the distribution conveyor by the flow control valve. At each of the flow control valves, a fraction of the stream of product on the distribution conveyor is discharged from the distribution conveyor to a receiving conveyor that branches off of the distribution conveyor. The receiving conveyor feeds a conditioning, weighing and packaging section of the facility.

Implementation of embodiments of the control method of the present invention requires that the rate at which the stream of product is discharged from the distribution conveyor, or the rate at which a stream of unconditioned product enters the seasoning station, may be determined using various methods. In one method, a section of the receiving conveyor that receives the product discharged by the flow control valve, such as an adjustable gate, and then delivers that stream of product to the seasoning station is supported using one or more load cells that sense the combined weight of the supported section of the conveyor and the portion of the stream of product that is supported on the supported section of the conveyor. The weight of the supported section of conveyor is known, and the weight of the portion of the product stream supported on the supported section of the conveyor can be determined by subtracting the weight of the supported section of conveyor from the load that is sensed by the load cells.

It will be understood that one conditioning, weighing and packaging (or bagging) section of the facility may apply a first seasoning to the raw product and an adjacent conditioning, weighing and packaging (or bagging) section of the facility may apply a second seasoning to the raw product.

FIG. 1 is a schematic illustrating the layout of a facility having a distribution conveyor 120 for moving a stream of product in the direction of the arrows 103 and 105 and to supply, via sequential flow control valves 10A and 10B, two receiving conveyors 72 and 74 that branch from the distribution conveyor 120, each to feed upstream processes 30A or 30B, respectively, each of which in turn feeds one of the downstream processes 50A or 50B, respectively. Intermediate the first flow control valve 10A and the associated upstream process 30A is a first measurement device 57A, and intermediate the second flow control valve 10B and the associated upstream process 30B is a second measurement device 57B.

While only two receiving conveyors 72 and 74 that branch from the distribution conveyor 120 are shown in FIG. 1, it will be understood that there may be other receiving conveyors that also branch from and receive product from the distribution conveyor 120, each additional receiving conveyor also receiving a stream of product from the distribution conveyor 120 through a flow control valve dedicated to that receiving conveyor. The inclusion of only two flow control valves 10A and 10B and two receiving conveyors 74 and 72 that receive product from the distribution conveyor 120 in FIG. 1 is merely for purposes of illustration and is not limiting of the scope of the present invention. It will be understood that multiple receiving conveyors 72 and 74 branching from the distribution conveyor 120 may be used for conditioning and/or for packaging streams of products differently. For example, but not by way of limitation, if the product produced within the facility illustrated in FIG. 1 is a prepared food such as potato chips, and if the distribution conveyor 120 is used to move cooked, but unflavored potato chips to the section of the facility where seasoning materials of different kinds are applied prior to bagging the seasoned product in bags marked with the specific type of seasoning material applied to the chips, the first conditioning process 30A may be used to apply a first seasoning material to the chips 70A that are subsequently weighed and bagged in the first weighing and bagging machine 50A, and a second conditioning process 30B may be used to apply a second seasoning material to the chips 70B that are subsequently weighed and bagged in the second weighing and bagging machine 50B.

A first fraction of the stream of products moved on the distribution conveyor 120 are discharged from the distribution conveyor 120 at the first flow control valve 10A and are moved from the first flow control valve 10A in the direction of arrow 75 on receiving conveyor 74 to the first upstream process 30A which may be, for example, a seasoning station that may be used to apply a first seasoning material. A second fraction of the remaining stream of products moved on the distribution conveyor 120 are discharged from the distribution conveyor 120 at the second flow control valve 10B and are moved from the second flow control valve 10B in the direction of arrow 73 on receiving conveyor 72 to the second upstream process 30B, which may be, for example, a seasoning station used to apply a different kind of seasoning material than that applied in the first upstream process 30A. The seasoned product from the first upstream process 30A are ultimately routed to the first downstream process (weighing and bagging machine) 50A, which produces bags of product 70A with the seasoning material conditioned in the first upstream process 30A. The seasoned product from the second upstream process 30B are ultimately routed to the second downstream process (weighing and bagging machine) 50B, which produces bags of product 70B with the seasoning material applied at the second upstream process 30B.

While a variety of different flow control valves may be used to implement embodiments of the control method of the present invention, the following discussion as it relates to FIGS. 2-10 are directed to one particular type of flow control valve, an in-line adjustable gate having a rotatable sleeve 116 with an opening 119 that is positionable by a motor 141 that is responsive to signals from a processor 100. It will be understood that the detailed description of one particular type of flow control valve should not be taken as limiting of the scope of embodiments of the control method of the present invention, which are limited only by the claims that are appended.

FIGS. 2-10 relate to the use of the in-line adjustable gate to controllably discharge a fraction of a stream of product from a distribution conveyor 120 to one of the two receiving conveyors 72 and 74 (not shown in FIG. 2—see FIG. 1) that branch from the distribution conveyor 120 to feed upstream processes 30A or 30B, respectively, that, in turn, feed downstream processes 50A or 50B, respectively. It will be understood that the implementation of an embodiment of the control method of the present invention is, at least in part, implemented through control of the adjustable gates 10A and 10B.

Figure 2:
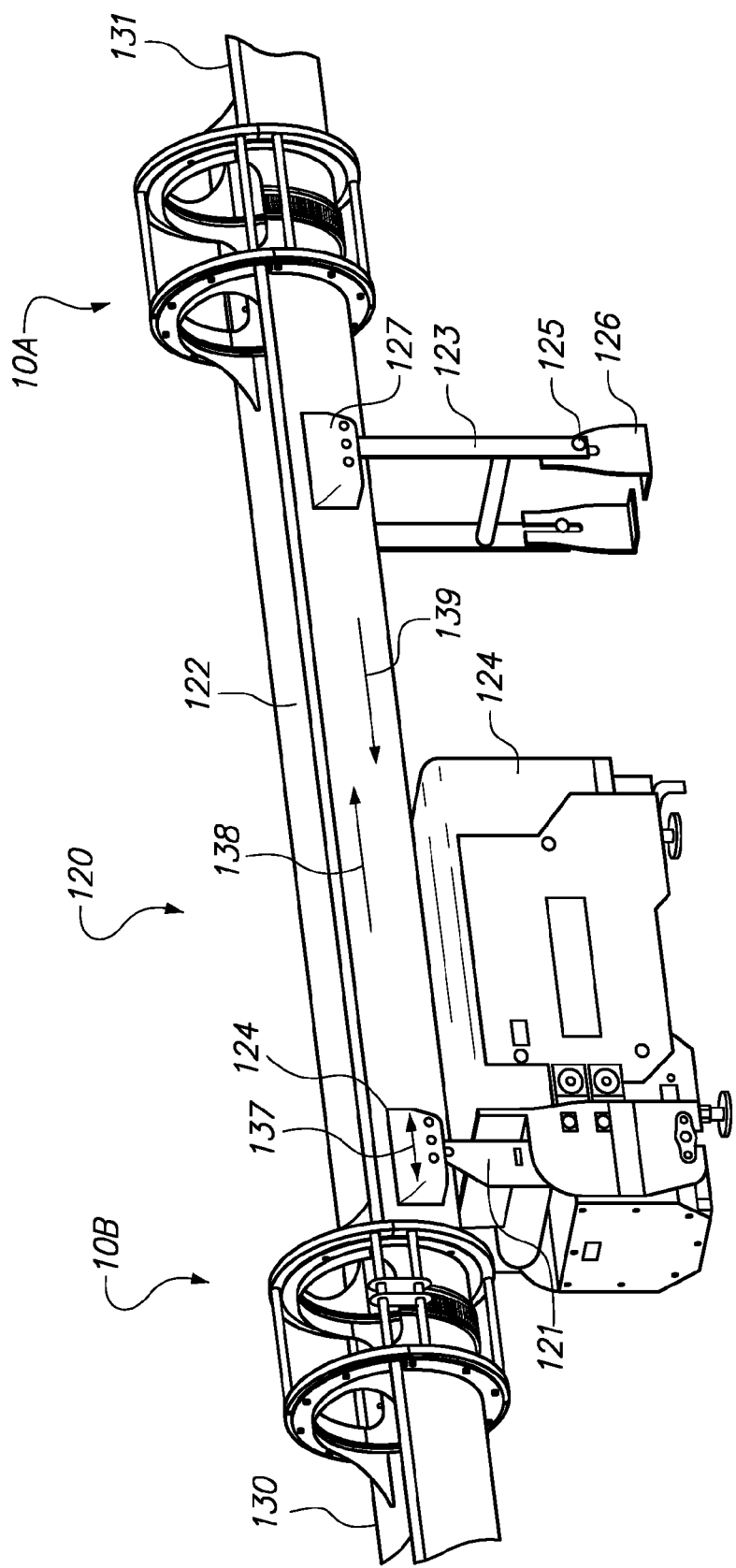
FIG. 2 is a perspective view of an embodiment of a distribution conveyor of the present invention having two adjustable gates.

FIG. 2 depicts an embodiment of a conveyor run 120 comprising an elongate tray 122 forming a trough which may have a generally semi-circular cross-section to move a stream of goods therein (not shown) along the generally linear path of the tray 122. The upstream processes 30A and 30B are not shown in FIG. 2 to better reveal the positions and appearance of the side-discharging adjustable gates 10A and 10B. The tray 122 of the conveyor run 120 is driven by reciprocating differential impulse driver 124 to reciprocate lengthwise by a differential impulse driver 124 that includes a rotary motor (not shown) and a mechanism for converting the rotary output of the motor to a reciprocating motion as indicated by the double-headed arrow 137. Support leg 123 is pivotally coupled to base 126 at pivot 125 and pivotally coupled to the tray 122 at leg coupling 127. A driver link 121 connects the differential impulse driver 124 to the tray 122 at a drive coupling 124.

The differential impulse driver 124 reciprocates the driver link 121 and the tray 122 connected thereto as indicated by the double-headed arrow 137. It will be understood that passive leg 123 merely pivotally supports the tray 122 and passively "follows" the tray 122 as it reciprocates as driven by the differential impulse driver 124. It will be understood that larger embodiments of conveyor runs 120 including adjustable gates 10 could be moved by two or more differential impulse drivers 124 that are together synchronized to cooperate in moving goods along the conveyor run 120.

In one mode of operation, the differential impulse driver 124 moves goods along the tray 122 in the direction indicated by the arrow 139 by moving the tray 122 slowly in the direction indicated by the arrow 139 and then more rapidly in the reversed direction indicated by the arrow 138 to restore the tray 122 to its original position. The acceleration of the tray 122 from its rightmost position and in the direction indicated by arrow 139 is sufficiently slow so that the raw product (not shown in FIG. 1) supported on the tray 122 move along with the tray 122 due to static friction between the raw products and the tray 122, but the acceleration of the tray 122 from the leftmost position and in the direction indicated by the arrow 138 is sufficiently great, relative to the previous acceleration of the tray 122 in the direction indicated by the arrow 139, so as to cause the raw product to slide along the tray 122 because the static friction between the raw product and the tray 122 is insufficient to prevent the raw product from sliding on the tray 122. The net displacement of the stream of raw product resulting from this cyclic and asymmetric reciprocation of the tray 122 in this manner will be in the direction indicated by the arrow 139, and such movement of the goods along the tray 122 will be at a generally steady and predictable rate of movement with very little damage to the raw product as compared to other conveyor types.

In one embodiment, the linear displacement of the tray 122 from the leftmost position and in the direction indicated by the arrow 138, and also from the rightmost position and in the reversed direction indicated by the arrow 139, may be within the range from 0.25 inches to 3.0 inches. The displacement imparted to the tray 122 by the differential impulse driver 124 can be adjusted to optimize performance of the conveyor run 120 with the specific raw product to be moved along the conveyor run 120.

Adjustable gates 10A and 10B are provided within the conveyor run 120 of FIG. 2 to provide the option of controllably splitting a stream of raw product received at the adjustable gate 10A on the right side of FIG. 2 by way of the conveyor run 120 into a first stream that is delivered to the adjustable gate 10B on the left side of FIG. 2 and a second stream of product delivered to the receiving conveyor 74 (not shown on FIG. 2), and then to further splitting the first stream delivered to the adjustable gate 10B on the left side of FIG. 2 into a third stream of product onto section 130 of the distribution conveyor 120 and a fourth stream of product delivered to the receiving conveyor 72. It should be noted that the configuration of the conveyor run 120 with adjustable gates 10A and 10B in the positions illustrated in FIG. 2 will result in simple pass-through of product; that is, the adjustable gates 10A and 10B in the conveyor run 120 illustrated in FIG. 2 are in a closed position (openings in the adjustable gates are in an elevated position) to prevent separation of a stream of goods that enter either of the adjustable gates 10A and 10B. As will be explained below in more detail, one or both of the adjustable gates 10A and 10B in the conveyor run 120 of FIG. 2 may be selectively adjusted to not only separate a stream of goods entering the adjustable gates 10A and 10B, but also to control the proportion of products that remain on the conveyor run 120 and, necessarily, the complimentary proportion of products that are discharged from the conveyor run 120 through the adjustable gate 10A or 10B.

While the tray 122 illustrated in FIG. 2 is generally semi-circular in shape, an alternate embodiment of the tray 122 could have a relatively flat and horizontal bottom with generally linear tray sides projecting upwardly at an obtuse angle to the bottom, much like the profile of an inverted isosceles trapezoid. A tray 122 having an inverted isosceles trapezoid cross-section may include a transition to a semi-circular cross-section positioned immediately adjacent to each end of an adjustable gate 10A or 10B. The semi-circular tray is the preferred configuration as it self-centers the product moving through the conveyor run 120 to allow the next adjustable gate to discharge or pass the correct proportions of the incoming product.

Figure 3:
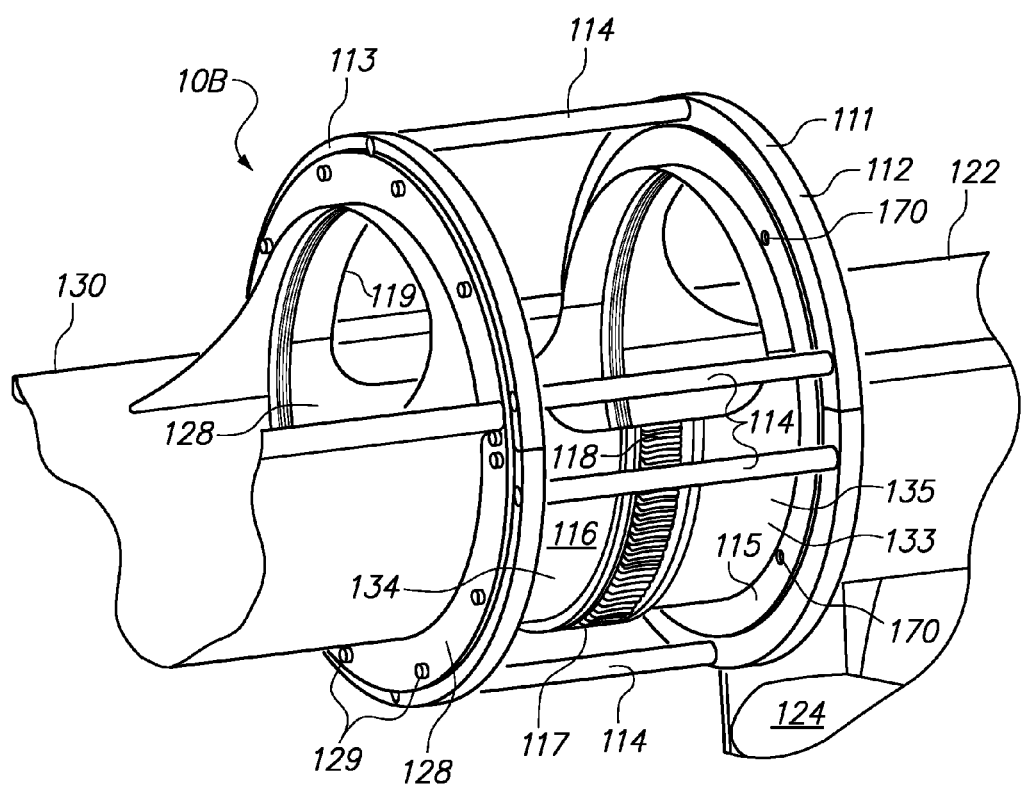
FIG. 3 is an enlarged view of one type of flow control valve, an adjustable gate, of FIG. 2 with a rotatable sleeve drive motor removed to reveal details of the adjustable gate.

FIG. 3 is an enlarged view of the leftmost adjustable gate 10B of the conveyor run 120 of FIG. 2 with the drive motor removed from the adjustable gate 10B to better reveal structural details of the adjustable gate 10B. The adjustable gate 10B of FIG. 3 comprises a cage 111 having a first end flange 112, a second end flange 113 and a plurality of circumferentially-spaced braces 114 connected therebetween. A conveyor portion 130 is connected at a flange coupling 115 to the second end flange 113 of the adjustable gate 10. The tray 122 is similarly connected at a flange coupling 115 to the first end flange 112.

The braces 114 of the adjustable gate 10B are connected between the first end flange 112 and the second end flange 113 of the cage 111. The braces 114 are together sufficiently robust to transfer large and cyclically-reversing loads imparted to the tray 122 coupled to the first end flange 112 of the cage 111, to the cage 111 itself, and to the conveyor portion 130 coupled to the second end flange 113 of the cage 111. More specifically, the braces 114 transfer loads imparted by the differential impulse driver 124, to the tray 122 through the first end flange 112 of the cage 111, through the braces 114, and to the second end flange 113 of the cage 111 to the conveyor portion 130. It will be understood that the load transferred by the braces 114 of the cage 111 of the adjustable gate 10 may generally include a cyclic compression-alternating-tension load directed generally along the braces 114 as a result of the reciprocation of the conveyor run 120 using the differential impulse driver 124. The loading may further include a cycling bending moment attributable to the centroid of the weight of the conveyor portions, for example, conveyor portion 130 and tray 122, located to the left and to the right of the adjustable gate 10B, respectively, being below a center axis through the first end flange 112 and second end flange 113.

FIG. 3 illustrates a rotatable sleeve 116 movably received within the cage 111. The rotatable sleeve 116 of FIG. 3 is slidably coupled at first end 133 of the rotatable sleeve 116 to the first end flange 112 of the cage 111 and at a second end 134 of the rotatable sleeve 116 to the second end flange 113 of the cage 111. A gear 117, having a plurality of gear teeth 118, is wrapped along a curved outer surface 135 of the rotatable sleeve 116. The rotatable sleeve 116 comprises an opening 119. The rotatable sleeve 116 is rotatable about a center axis (not shown) using a motor (not shown in FIG. 3—see FIG. 4) to position the opening 119 between an elevated position, illustrated in FIG. 3, and a lowered position illustrated in FIG. 4. In one embodiment of the adjustable gate 10B, the motor (not shown in FIG. 3) is reversible. The gear 117 extends only about a portion of the curved outer surface 135 of the rotatable sleeve 116 so as to leave the opening 119 unobstructed. It will be understood that the gear 117 may be described as a segment of a spur gear.

FIG. 3 reveals a tray flange 128 connected to the second end flange 113 of the cage 111 of the adjustable gate 10B using conventional fasteners 129. The tray flange 128 couples the conveyor portion 130 to the left of the adjustable gate 10B in FIG. 3 to the cage 111 of the adjustable gate 10B. It will be understood that a similar tray flange 128 is disposed on the right side of the adjustable gate 10B in FIG. 3 to couple the tray 122 to the first end flange 112 of the cage 111 of the adjustable gate 111. FIG. 3 further reveals the rightmost positioning ring 115 of the rotatable sleeve 116 of the adjustable gate 10B. The leftmost positioning ring 115 of the rotatable sleeve 116 of the adjustable flange 10B is hidden from view in FIG. 3. Each positioning ring 115 rotates within the cage 111 of the adjustable gate 10B along with the rotatable sleeve 116. The positioning ring 115 visible in FIG. 3 includes threaded apertures 170. These threaded apertures 170 are used to couple spring-biased plunger assemblies 171 (not shown in FIG. 3—see FIGS. 8 and 9) to the positioning rings 115 on the rotatable sleeve 116 of an adjustable gate 10B, as will be discussed in more detail in connection with FIGS. 8 and 9.

Figure 4:
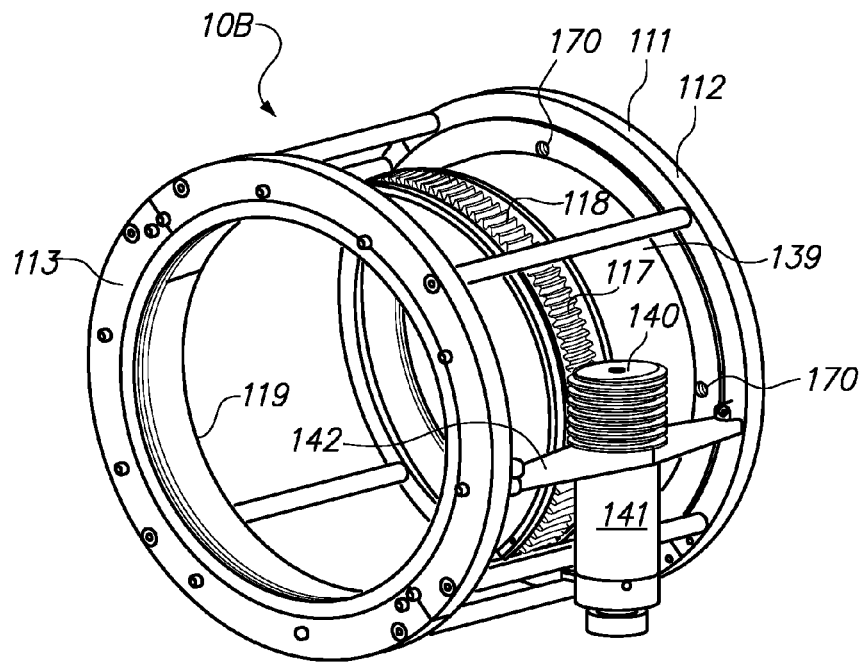
FIG. 4 is a perspective view of the embodiment of the leftmost adjustable gate of FIG. 2 with the drive motor coupled to the adjustable gate to controllably rotate the rotatable sleeve.

FIG. 4 is a perspective view of the embodiment of the adjustable gate 10B of FIG. 3 decoupled from the conveyor portion 130 and the tray 122 and with a motor 141 and a drive gear 140 operably coupled to controllably position the rotatable sleeve 116 within the cage 111 of the adjustable gate 10. The motor 141 is coupled to a motor support 142 that is, in turn, coupled intermediate the first end flange 112 and the second end flange 113 of the cage 111 of the adjustable gate 10. The drive gear 140, which is a worm gear, is rotatable by the motor 141 to slidably engage teeth 118 of the gear 117 and to move the gear 117 on the rotatable sleeve 116 either upwardly along the drive gear 140 or downwardly along the drive gear 140, depending on the direction of rotation of the drive gear 140 by the motor 141.

The adjustable gates 10A and 10B illustrated in FIGS. 2 and 3 show the rotatable sleeve 116 with the opening 119 in an elevated position so that all goods entering the adjustable gate 10 will pass through the rotatable sleeve 116 regardless of the direction of movement of the goods along the conveyor run 120. FIG. 4 shows the rotatable sleeve 116 with the opening 119 lowered by operation of the motor 141 so that product entering the adjustable gates 10B will drop through the lowered opening 119 and from the adjustable gate 10 to a directly receiving conveyor so that no goods pass through the adjustable gate 10B. It will be understood that the motor 141 of FIG. 4 can be controllably operated to position the opening 119 of the rotatable sleeve 116 of the adjustable gate 10B between these two extreme positions illustrated in FIG. 3 (elevated) and FIG. 4 (lowered) so that some of the products are dropped from the adjustable gate 10B and some of the products pass through the adjustable gate 10B.

Figure 5:
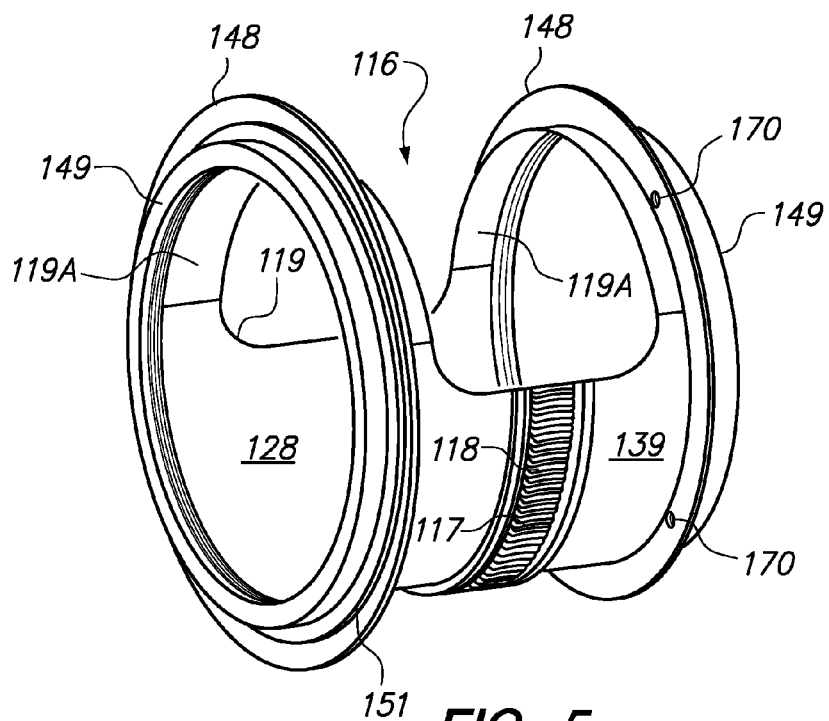
FIG. 5 is a perspective view of the rotatable sleeve of the adjustable gate of FIG. 4.

FIG. 5 is a perspective view of the rotatable sleeve 116 of the adjustable gate 10B of FIG. 4 disposed intermediate a pair of wear shoes 149. Each wear shoe 149 has a flange 151 that engages the positioning ring 148 of the rotatable sleeve 116. The wear shoes 149 reside within the cage 111 of the adjustable gate 10 along with the rotatable sleeve 116 to engage and position the positioning rings 148 of the rotatable sleeve 116 as it cyclically accelerates and decelerates within the cage 111 (not shown in FIG. 5—see FIG. 4). The wear shoes 149 cooperate with plunger assemblies 171, which are discussed in more detail in connection with FIGS. 8 and 9. FIG. 5 reveals the structures that seal with, position and movably couple the rotatable sleeve 116 within the cage 111. FIG. 5 reveals the positioning rings 148 extending radially outwardly from the rotatable sleeve 116, each positioning ring 148 having threaded apertures 170 for coupling spring-biased plunger assemblies 171. In the assembled state illustrated in FIG. 4, the rightmost positioning ring 148 (not shown in FIG. 4—see FIG. 5) of the rotatable sleeve 116 is received into a corresponding interior groove (not shown) within a bore of the first end flange 112 (not shown in FIG. 5—see FIG. 4) of the cage 111 and the leftmost positioning ring 148 (not shown in FIG. 4—see FIG. 5) is received into a corresponding interior groove (not shown) within a bore of the second end flange 113 (not shown in FIG. 5—see FIG. 4) of the cage 111. As can be seen in FIG. 4, the first end flange 112 and the second end flange 113 are each constructed by combining two semi-circular halves and coupling the halves together to form the fully circular first and second end flanges 112 and 113. This arrangement is akin to a clamshell structure that receives the positioning rings 148 within interior grooves within the end flanges 112 and 113 of the cage 111. The positioning rings 148 of the rotatable sleeve 116 illustrated in FIG. 5 radially engage and slide within the corresponding interior grooves of the cage 111, and axially engage and rotate against the wear shoes 149 captured within the cage 111 along with the rotatable sleeve 116. The wear shoes 149 and the cage 111 cooperate to maintain the rotatable sleeve 116 in a desired position within the cage 111 while allowing the opening 119 to be selectively positioned by operation of the motor 141.

It will be understood that the cyclic acceleration and deceleration imparted to the adjustable gates 10 through the tray 122 (see FIG. 2) would impart a recurring slapping or lashing effect to the rotatable sleeve 116 disposed within the cage 111 of the adjustable gate 10 without mechanical features provided to minimize the damage resulting from such rigorous motion. The wear shoes 149 function as very (axially) short journal bearings that intermittently engage and bear against the rotatable sleeve 116 within the bores of the first end flange 112 and the second end flange 113 of the cage 111. When the motor 141 is operated, the rotatable sleeve 116 is rotated within the cage 111 of the adjustable gate 10 to elevate or to lower the opening 119. If the opening 119 is positioned as illustrated in FIG. 4, goods moving from, for example, the tray 122 into the rotatable sleeve 116 of the adjustable gate 10B will fall through the opening 119 to a receiving conveyor 72 as shown in FIG. 1. When the rotatable sleeve 116 is rotated within the cage 111 of the adjustable gate 10 to elevate the opening 119, as illustrated in FIGS. 2, 3 and 5, product entering the adjustable gate 10B will pass through the rotatable sleeve 116 and through the wear shoes 149 that straddle the rotatable sleeve 116. The adjustable gate 10B opening 119 may be positioned at a number of positions intermediate the lowered and elevated positions illustrated in FIGS. 4 and 3, respectively, so that a controllably selectable portion of the stream of product that enters the adjustable gate 10B will pass through the rotatable sleeve 116 of the adjustable gate 10B and remain on the conveyor run 120 while the remainder of the stream of product will fall through the opening 119 of the adjustable gate 10B and be dropped from the conveyor run 120 that includes the adjustable gate 10B and onto the receiving conveyor 72 (see FIG. 1).

Foodstuffs are among the types of products that can be moved and transported using embodiments of the conveyor run 120 and embodiments of the adjustable gate 10B of the present invention. By their nature, foodstuffs such as, for example, potato chips and other prepared foods, are seasoned, salted or produce crumbs as a result of being handled and moved. It is advantageous if embodiments of the adjustable gate 10B of the present invention are constructed to move this type of products through the adjustable gate 10B, or into the adjustable gate 10B and through the opening 119 of the rotatable sleeve 116, with minimal breakage of the individual products and in a manner that prevents fouling of the moving parts of the adjustable gate 10B by broken crumbs, seasoning, salt, etc. that may find their way into crevices, gaps, seams and recesses in the adjustable gate 10B itself or in the interfaces at the ends of the adjustable gate 10B where the adjustable gate 10B meets with conveyor portions 130 and 120 that can be used to receive goods from the adjustable gate 10B or to move goods into the adjustable gate 10B.

One embodiment of the gate of the present invention includes structures to isolate the surfaces of the rotatable sleeve 116 on which goods are supported and moved and to prevent unwanted materials from escaping the product-supporting surfaces or from fouling the interfaces between moving and non-moving components of the adjustable gate 10B.

Figure 6:
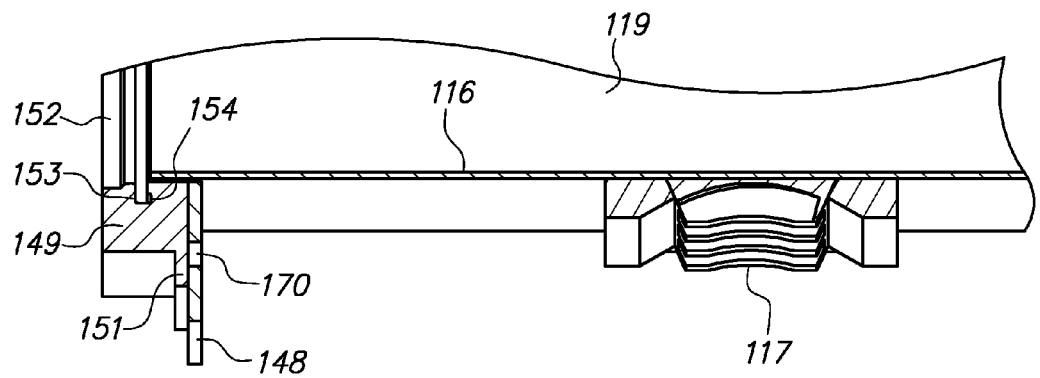
FIG. 6 is a partial cross-sectional view of a portion of the adjustable gate and a wear shoe.

FIG. 6 is an enlarged partial cross-sectional view of a portion of an embodiment of the adjustable gate 10B. The position of the rotatable sleeve 116 in FIG. 6 corresponds to the opening 119 being in the elevated position as illustrated in FIG. 5 and reveals the sealing structures between the rotatable sleeve 116 and the wear shoe 149 disposed adjacent thereto. FIG. 6 also shows the gear 117 of the rotatable sleeve 116 and the leftmost positioning ring 148 of the rotatable sleeve 116 disposed adjacent to the wear shoe 149. The wear shoe 149 includes a seal groove 154 into which a seal extension 153 is received.

Figure 7:
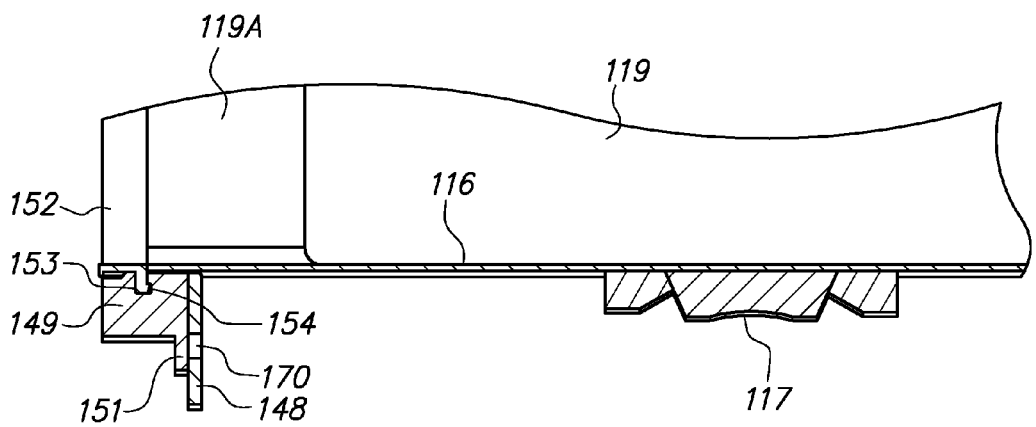
FIG. 7 is a partial cross-sectional view of a portion of the adjustable gate showing the relationship of the rotatable sleeve, an adjacent wear shoe and a seal.

FIG. 7 is an enlarged partial cross-sectional view of a portion of an embodiment of the adjustable gate 10. The position of the rotatable sleeve 116 in FIG. 7 corresponds to the opening 119 being in the lowered position as illustrated in FIG. 4 and reveals the sealing structures between the rotatable sleeve 116 and the wear shoe 149. The rotatable sleeve 116 includes the opening 119 and the adjacent opening periphery 119A (also shown in FIG. 5). FIG. 7 also shows the gear 117 of the rotatable sleeve 116 and the leftmost positioning ring 148 of the rotatable sleeve 116 disposed adjacent to the wear shoe 149. The wear shoe 149 includes a radially-outwardly extending portion 151 to increase the area of engagement between the wear shoe 149 and the positioning ring 148. The threaded aperture 170 in the positioning ring 148 of the rotatable sleeve 116 is shown in FIG. 6. This threaded aperture 170 is discussed in more detail below and in connection with FIG. 9.

Wear shoes 149 bear the axial loading of the rotatable sleeve 116 of the adjustable gate 10B that results from the adjustable gate 10B being cyclically moved back and forth by the differential impulse driver 124 shown in FIG. 2. It will be understood that cyclical forces imparted by the differential impulse driver 124 through a conveyor portion proximal to the adjustable gate 10 are transferred to the rotatable sleeve 116 and to the abutting wear shoes 149 through spring-biased plunger assemblies 171 (see FIG. 8).

Figure 8:
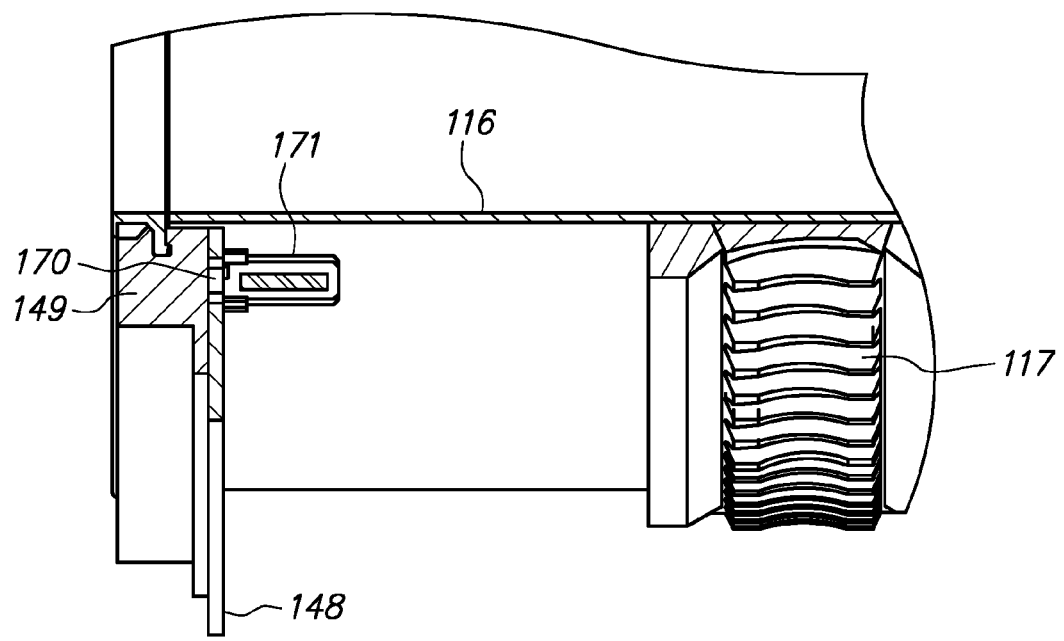
FIG. 8 is an enlarged partial cross-sectional view of a portion of an embodiment of the adjustable gate after a plunger assembly is coupled to the rotatable sleeve.

FIG. 8 is an enlarged partial cross-sectional view of a portion of an embodiment of the adjustable gate 10 after a plunger assembly 171 is coupled to the rotatable sleeve 116. The plunger assembly 171 is coupled to the rotatable sleeve 116 intermediate the rotatable sleeve 116 and the wear shoe 149 disposed adjacent to the positioning ring 148 of the rotatable sleeve 116. In one embodiment of the adjustable gate 10 of the present invention, a plunger assembly 171 is coupled to the positioning ring 148 at the left side of the adjustable gate 10B and another spring-biased plunger assembly 171 is coupled to the opposite, right side of the adjustable gate 10 to provide controlled movement of the rotatable sleeve 116 of the adjustable gate 10 relative to the straddling wear shoes 149 on either side of the rotatable sleeve 116.

Figure 9:
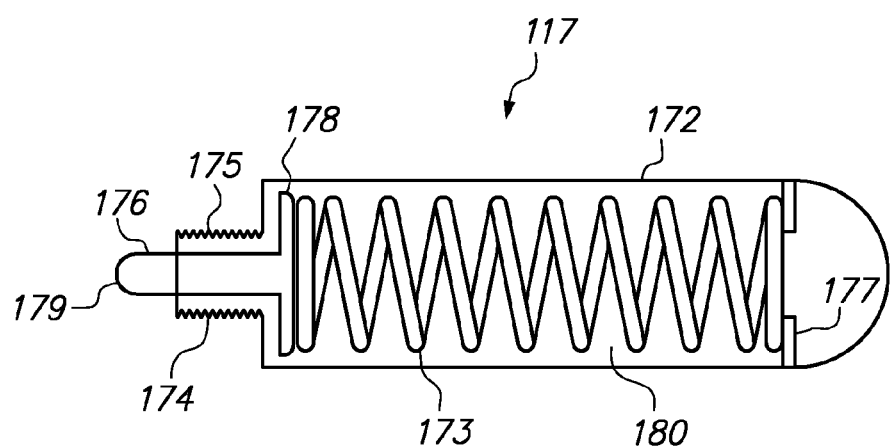
FIG. 9 is an enlarged and sectional view of the spring-biased plunger assembly of FIG. 8 removed from the rotatable sleeve for clarity.

FIG. 9 is an enlarged and sectional view of the spring-biased plunger assembly 171 of FIG. 8 removed from the rotatable sleeve 116 for clarity. The plunger assembly 171 comprises a body 172 having an interior chamber 180 to receive a coil spring 173 therein. The coil spring 173 is captured in a slightly compressed configuration intermediate the stop 177 near the end of the chamber 180 and a plunger tip 176. The body 172 includes a connector 174 having a diameter and threads 175 that correspond to the diameter and threads within the threaded aperture 170 in the positioning rings 148 (see FIGS. 3-5, 6 and 7). The plunger tip 176 includes a base 178 that engages the coil spring 173 and a wear-resistant nose 179 that engages the wear shoe 149 as shown in FIG. 8.

It will be understood that the rotation of the rotatable sleeve 116 within the cage 111 requires at least some clearance between the rotatable sleeve 116 and the straddling wear shoes 149. The amount of clearance may be, for example, 20 to 30 thousands of an inch. The clearance between the surface of the wear shoe 149 and the adjacent positioning ring 148 of the rotatable sleeve 116, along with the thickness of the positioning ring 148 and the mass of the rotatable sleeve 116, are among the factors that can be considered in the design of the plunger assembly 171. It will be further understood that, as the plunger assembly 171 is threadably installed into the threaded apertures 170 of the positioning rings 148 of the rotatable sleeve 116, the coil spring 173 will begin to be compressed at the time that the nose 179 of the plunger tip 176 engages the wear shoe 149 and, as the plunger assembly 171 is threaded into the aperture 170, the coil spring 173 will be loaded. The plunger assemblies 171 will maintain the position of the rotatable sleeve 116 between the straddling wear shoes 149 and will store and return kinetic energy imparted to the rotatable sleeve 116 by operation of the differential impulse driver 124. The plunger assemblies 171 will protect the rotatable sleeve 116 against the damaging effects of recurring cyclic slap that would otherwise damage the rotatable sleeve 116.

Figure 10:
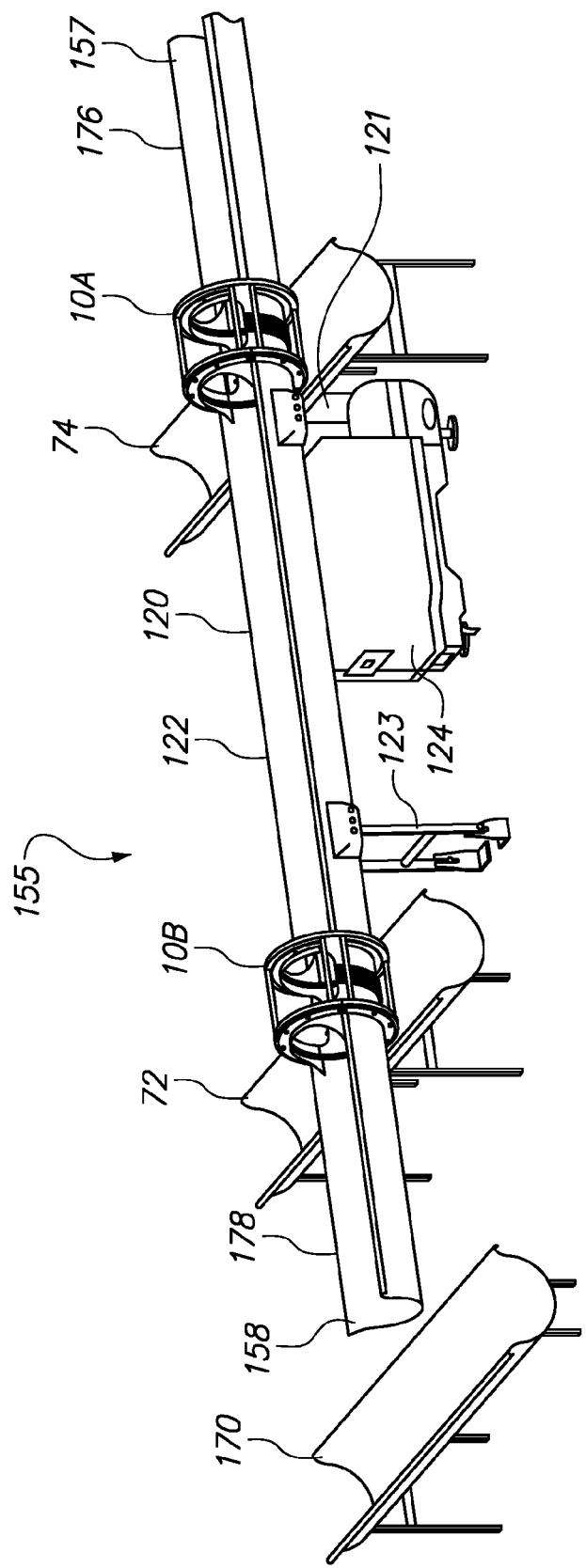
FIG. 10 depicts another embodiment of a distribution conveyor with two in-line flow control valves (adjustable gates) for discharging an adjustable fraction of the product stream moved on the distribution conveyor to adjacent receiving conveyors, each for feeding an upstream process (not shown in FIG. 10) that, in turn, feeds an associated downstream process (not shown in FIG. 10).

FIG. 10 depicts another embodiment of a conveyor system 155, with a conveyor portion 176 separated from an adjacent conveyor portion 122 by first (rightmost) adjustable gate 10A, and with conveyor portion 122 separated from an adjacent conveyor portion 178 by second (leftmost) adjustable gate 10B. A receiving conveyor 74 is positioned to receive goods dropped from the first adjustable gate 10A, and another receiving conveyor 72 is positioned to receive goods dropped from the second adjustable gate 10B. Another receiving conveyor portion 170 is positioned to receive goods that move from right to left and that are not dropped from either of the adjustable gates 10A and 10B.

Conveyor portion 176, the first adjustable gate 10A, conveyor portion 122, the second adjustable gate 10B and conveyor portion 178 all combined make up conveyor run 120. Receiving conveyor 74, receiving conveyor 72 and receiving conveyor 170 may, in certain configurations of the adjustable gates 10A and 10B, receive product received onto the conveyor run 120 at the receiving end 157. Product routed to receiving conveyor 170 are discharged from dropping end 158 of the conveyor run 120. It will be understood that the terms "receiving end 157" and "dropping end 158" are direction dependent terms, and indicate that the differential impulse driver 124 is configured to move goods from right to left along the conveyor run 120. If the differential impulse driver 124 is reversed to move goods from the left to the right along the conveyor run 120, the terms would be reversed to indicate a receiving end 158 and a dropping end 157. It will also be understood that the source conveyor is not shown in FIG. 10 for clarity, but a source conveyor providing goods to be moved on the conveyor system 155 of FIG. 10 would drop the goods onto one of conveyor portion 176, conveyor portion 122 and conveyor portion 178. It will be further understood that two source conveyors may be used to drop goods to be moved on the conveyor system 155. For example, source conveyors could drop goods onto all three of conveyor portion 176, conveyor portion 122 and conveyor portion 178 if the differential impulse driver 124 is configured to move goods from right to left in FIG. 10. Source conveyors could also drop goods onto conveyor portion 176, conveyor portion 122 and conveyor portion 178 if the differential impulse driver 124 is configured to move goods from left to right in FIG. 10, depending on what is provided to the right of what would, with that configuration of the differential impulse driver 124, be dropping end 157. The conveyor system 155 of FIG. 10 provides a highly versatile system for distributing one or more source streams of goods to multiple locations, with adjustable gates 10A and 10B providing a large amount of the flexibility.

The product moved by the conveyor system 155 includes a distribution conveyor 120 and three receiving conveyors 74, 72 and 170. It will be understood that, if product is moving from a receiving end 157 of the distribution conveyor 120 towards the discharging end 158 of the distribution conveyor 120, product streams can be controllably routed to a single destination such as, for example, receiving conveyor 74, receiving conveyor 72 or receiving conveyor 170 by positioning of the adjustable gates 10A and 10B to the appropriate positions. For example, but not by way of limitation, all product received at the receiving end 157 of the distribution conveyor 120 can be delivered to: receiving conveyor 74 by adjusting the in-line adjustable gate 10A to discharge all of the incoming product stream; receiving conveyor 72 by adjusting the in-line adjustable gate 10A to discharge none of the incoming product stream and by adjusting in-line adjustable gate 10B to discharge all of the incoming product stream; and receiving conveyor 170 by adjusting both of in-line adjustable gates 10A and 10B to discharge none of the incoming product stream. It will be understood that the incoming product stream can be divided into two or three sub-streams of desired proportions by adjusting the in-line adjustable gates 10A and 10B to discharge only as much of the incoming product stream as is needed at each receiving conveyor.

It will be further understood that while receiving conveyors 170, 72 and 74 are shown without differential impulse drivers 124 of the kind that is illustrated in FIG. 2 as reciprocating the distribution conveyor 120. The differential impulse drivers 124 for receiving conveyors 74, 72 and 170 are omitted for purposes of simplification of FIG. 10, and these conveyor runs may also be equipped with differential impulse drivers 124 and pivoting support legs 123 to add more options for the distribution of product at a process site. It will be further understood that receiving conveyors 72, 74 and 170 are truncated at each end in FIG. 10 to better reveal the distribution conveyor 122 and the adjustable gates 10A or 10B. The receiving conveyors 72, 74 and 170 can each be operated by differential impulse drivers 124 and can each be used to move product to another process in the facility.

FIGS. 2-10 illustrate one type of flow control valve. Flow control valves such as adjustable conveyor gates, as opposed to batch release conveyor gates, are essential for implementing embodiments of the control method of the present invention because a flow control valve enables an operator, or an actuator that is responsive to a computer program programmed and used by the operator, to vary the rate at which the product enters the upstream process. While the in-line adjustable gates 10A and 10B of the kind illustrated in FIGS. 2-10 and disclosed herein may be used, other adjustable gates exist that can also be used, and the scope of the present invention is not limited to the use of the adjustable gates 10A and 10B of the kind and type illustrated herein. Embodiments of the control method of the present invention are limited only by the claims that are appended hereto.

Figure 11:
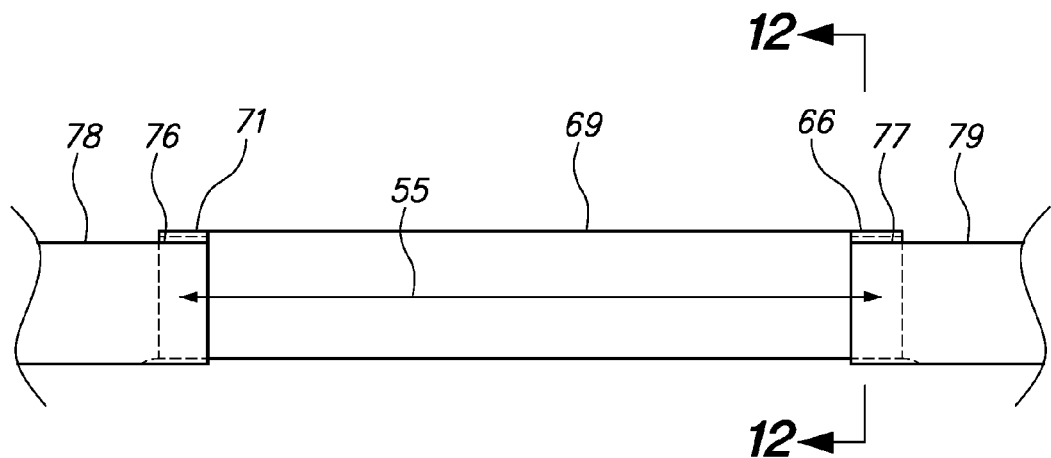
FIG. 11 is an elevation view of a section of a reciprocating conveyor equipped with load cells to enable measurement of the rate at which a conveyed raw product is delivered to an upstream process (not shown).

FIG. 11 is an elevation view of a section 69 of a portion of the tray 122 of the receiving conveyor 72 or 74 equipped with a first load cell pair 76 at a first end 71 of the portion of the tray 122 and a second load cell pair 77 at a second end 66 of the portion of the section 69 to enable measurement of the rate at which a conveyed raw product is delivered from a flow control valve 10A or 10B to an upstream process 30A or 30B, respectively (flow control valves 10A and 10B and upstream processes 30A and 30B are not shown in FIG. 11). The conveyor section 69 illustrated in FIG. 11 has a known weight and length 55, and is supported at a first end 71 by a first adjacent conveyor portion 78 and at a second end 66 by a second adjacent conveyor section 79. The first load cell pair 76 and the second load cell pair 77 sense the load imparted to the load cell pairs 76 and 77 and generate corresponding signals to a processor 100 (not shown in FIG. 11—see FIG. 19) indicating the load sensed by each load cell pair 76 and 77. These signals can be used to determine the weight of the portion of the stream of product supported within the conveyor section 69.

Figure 12:
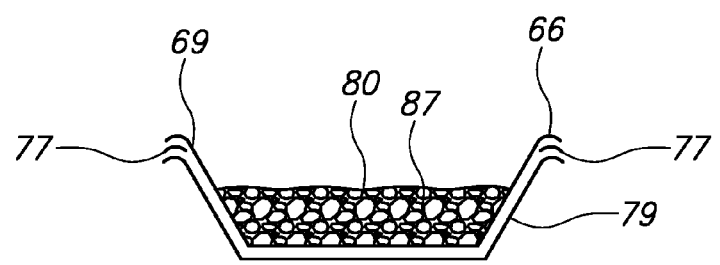
FIG. 12 is a sectional view of the reciprocating conveyor of FIG. 11 illustrating the profile of the conveyor and a stream of product being conveyed within the conveyor.

FIG. 12 is a sectional view of the conveyor section 69 of FIG. 11 at the second end 66 where the conveyor section 69 is supported by the second adjacent conveyor section 79. The second load cell pair 77 are shown as captured intermediate the conveyor section 69 and the supporting second adjacent conveyor section 79. FIG. 12 illustrates a stream of product 87 supported within the conveyor section 69. The weight of the stream of product 87 within the conveyor section 69 can be detected using the first load cell pair 76 and a second load cell pair 77. The speed at which the stream of product moves through the conveyor section 69 is known and observable, and the load cell data along with the length of the conveyor section 69, the weight of the conveyor section 69 and the speed at which the stream of product is moved by the conveyor section 74 enables the rate of mass flow to the seasoning station 30A or 30B (not shown in FIG. 11) to be calculated with accuracy.

In other embodiments of the conveyor section 69, the stream of product 87 has an interface height 80 that is detectable using one of an optical interface sensor (not shown) and an ultrasonic interface sensor (not shown in FIGS. 11 and 12).

Figure 13A:
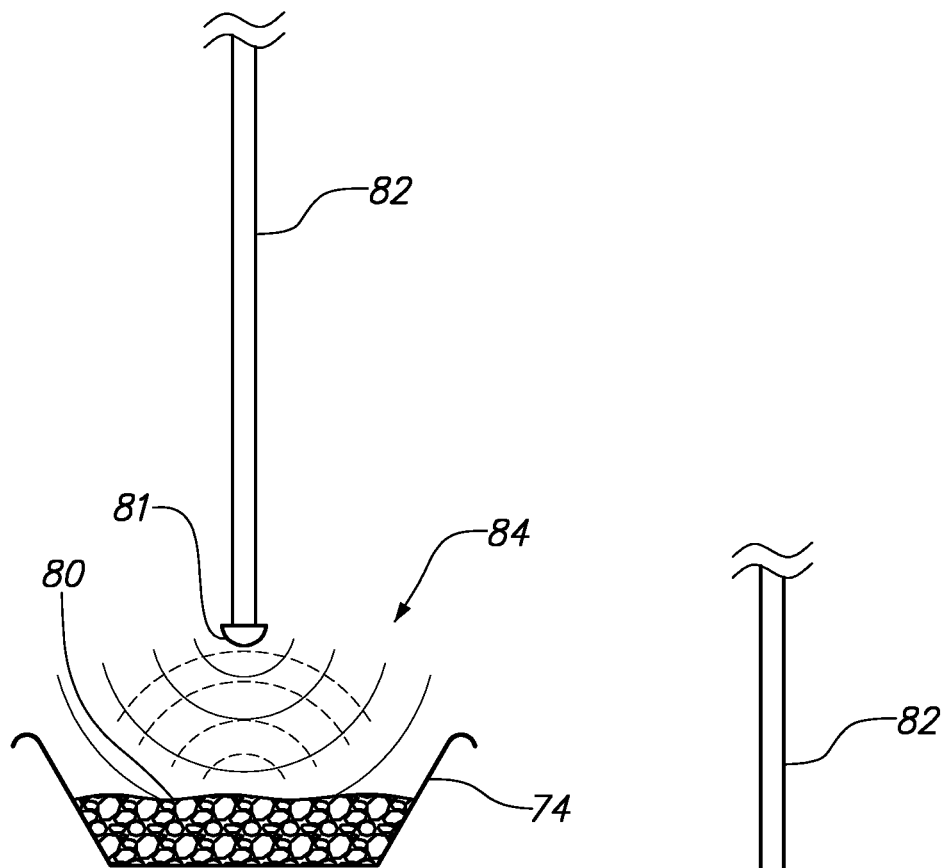
FIG. 13A is the sectional view of FIG. 12 with an ultrasonic or optical instrument disposed above the conveyor to detect a height interface of the product stream in the conveyor.

FIG. 13A illustrates the use of one of an ultrasonic sensor 81 to detect the interface height 80 of the stream of product 87 supported within the conveyor section 69. The ultrasonic sensor 81 emits an ultrasonic wave 84 that reflects off of the height 80 of the stream of product 87 and is received at the sensor 81. Given that the position of the sensor 81 relative to the conveyor section 69 is known and observable, the amount of time required for the emitted signal to reflect and then received at the sensor 81 can be used to determine the interface height 80 of the stream of product 87. The determined interface height 80 of the stream of product 87, the empirically determined weight of the stream of product 87 per unit length for that interface height 80, and the observed speed at which the product moves along the conveyor section 69 can together be used to calculate the mass rate flow of product moving across the conveyor section 69 to the seasoning system 30A fed by the conveyor section 69.

Figure 13B:
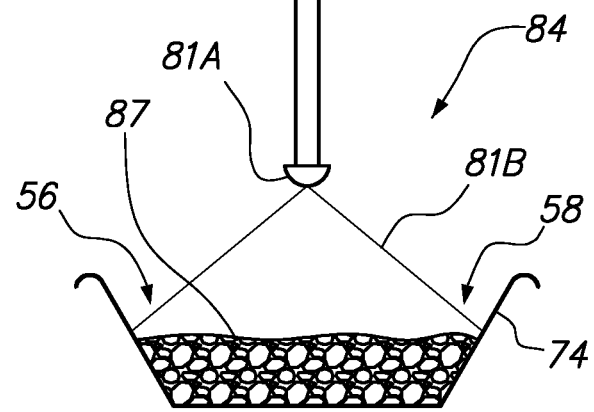
FIG. 13B illustrates the use of an optical sensor to sense an interface angle corresponding to a given loading of product on a conveyor section which creates a first conveyor wall—product interface and a second conveyor wall—product interface defining the stream of product.

FIG. 13B illustrates the use of an optical sensor 81A to sense an interface angle 81B corresponding to a given loading of product 87 on a conveyor section 69 which creates a first conveyor wall—product interface 56 and a second conveyor wall—product interface 58 defining the stream of product 87. The angle between the first conveyor wall-product interface 56 and the second conveyor wall-product interface 58 81B can be correlated using an empirically-developed look-up table to determine the mass flow rate corresponding to the observed angle 81B. Another optical sensor may be used to detect the location of one or both conveyor wall-product interfaces 56 and 58 using optically-detectable and axially aligned markers such as, for example, stripes or gradations imposed on the interior walls of the conveyor.

This mass flow rate of product may be used to control the rate at which seasoning is applied to the stream of product delivered to the upstream process (seasoning system) 30A. For example, if a particular seasoning is to be applied at a 0.5 to 12% by weight ratio, the determined mass flow rate of product moving across the conveyor section 74 to the seasoning station 30A can be multiplied by 0.005 to 0.12 to determine the rate of application of the seasoning, and the speed of a motor that drives an augur, for example, can be adjusted to ensure that the product is neither over-seasoned or under-seasoned. It will be understood that the conveyor section 69 load cell pairs 76 and 77 and/or the interface height 80 can be monitored and the rate at which seasoning is applied can be adjusted on an ongoing basis.

In another method, the height of the product that is supported within the conveyor 69 is detected using one of an optical and an ultrasonic instrument. The rate at which the product is conveyed to the seasoning system is determined by calculating the cross-sectional area of the product stream supported within the conveyor section 69, and determining the mass flow rate based on the observed speed of the product moving on the conveyor section 69 and an empirically-determined density of the product stream 87 of the detected interface height 80 or interface angle 81B.

Figure 14:
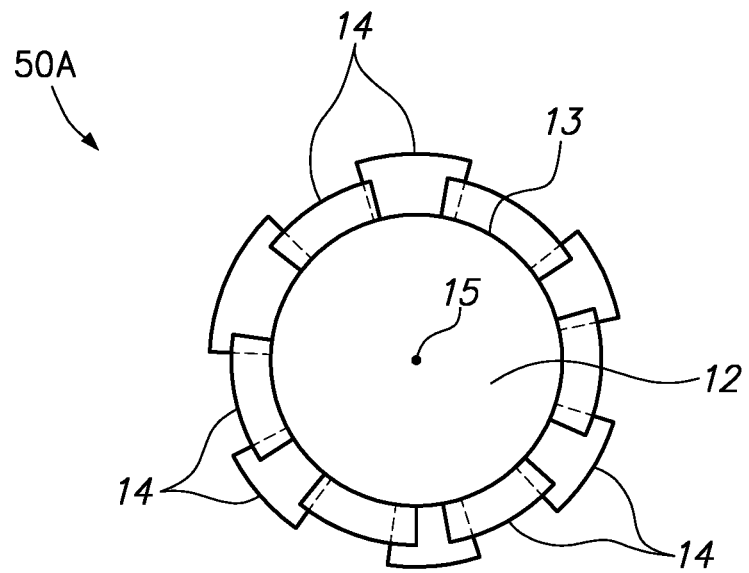
FIG. 14 is a plan view of a weighing and bagging machine that can be, along with an associated seasoning system, controlled using an embodiment of the control method of the present invention.

FIG. 14 is a plan view of a weighing and bagging machine 50A that can be, along with an associated seasoning system 30A (not shown in FIG. 14), controlled using an embodiment of the control method of the present invention. The weighing and bagging machine 50A of FIG. 14 includes a dispersion surface 13 including a high point 15 from which the dispersion surface 13 slopes downwardly. The dispersion surface 13 may be domed (dispersion dome) or conical in shape (dispersion cone), or the dispersion surface 13 may have other shapes. The weighing and bagging machine 50A further includes a plurality of buckets 14 disposed circumferentially about and below the dispersion surface 13 to catch and retain individual portions of the product stream (not shown in FIG. 14) that fall from the dispersion surface 13. The buckets 14 illustrated in FIG. 14 are circumferentially overlapping to promote the catching of most or all of the individual food portions of the product stream.

Figure 15A:
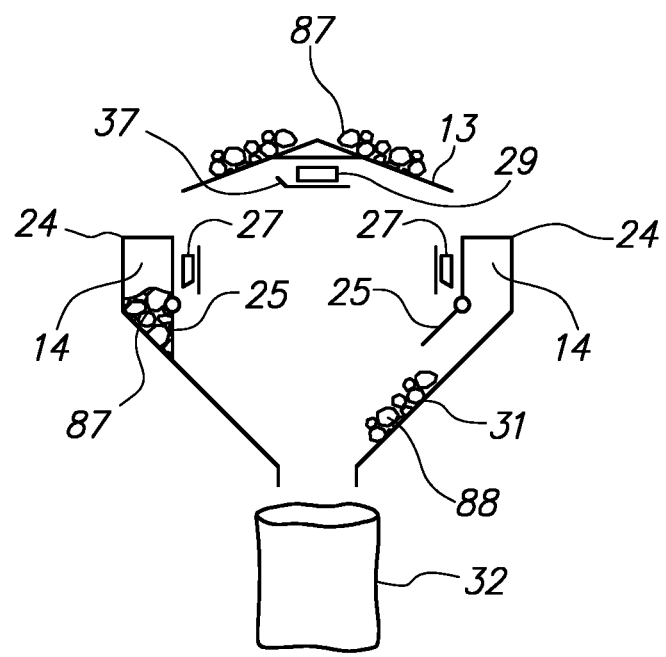
FIG. 15A is a sectional elevation view of the weighing and bagging machine of FIG. 14 illustrating the manner in which accumulated product of known weight is discharged from the buckets into a bag.

FIG. 15A is a sectional view of the weighing and bagging machine 50A of FIG. 14 illustrating the manner in which accumulated product of known weight is discharged from the buckets 14 into a bag 32. FIG. 15A illustrates the dispersion surface 13 onto which an amount of seasoned product 87 is discharged. The seasoned product 87 descends from the dispersion surface 13 circumferentially through which individual portions of the product 87 are discharged to fall into the buckets 14. Each bucket 14 is coupled to a load cell 27 that generates a signal to a processor (not shown) corresponding to the weight of the bucket 14 and the seasoned product 87 received within the bucket 14. Each bucket 14 is equipped with a dumping door 25 (illustrated in the opened position to drop or release product) and 25 (illustrated in the closed position to accumulate and/or hold product) that can be opened and closed by activation of an actuator (not shown in FIG. 15A). Upon activation of the actuator, the closed dumping door 25 can be moved from the closed position, shown on the left of FIG. 15A, to an open position shown by the dumping door 25 on the right of FIG. 15A. When the dumping door 25 moves to the open position, the accumulated product 87 within the bucket 14 drops from the bucket 14 into a chute 31 as shown by the dumped product 88. The dumped product 88 continues to descend to the bag 32 positioned underneath the chute 31 to receive the dumped product 88.

Figure 15B:
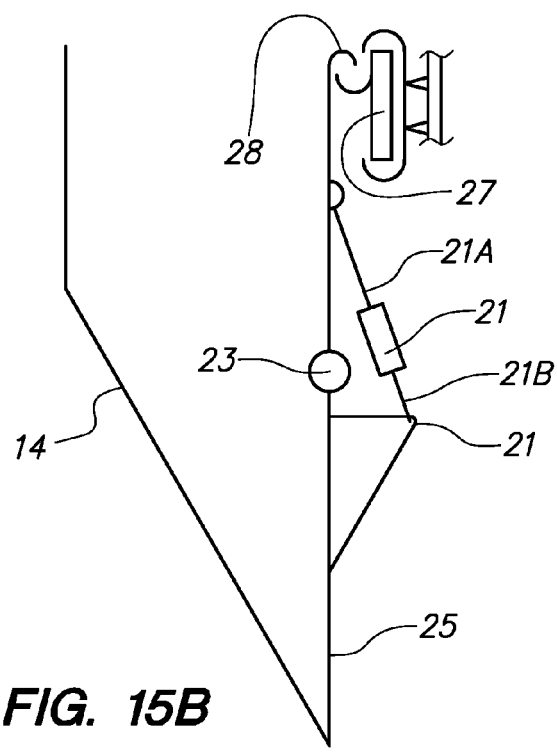
FIG. 15B is an enlarged sectional view of a bucket of the weighing and bagging machine having a bracket coupled to a support and a load cell disposed intermediate the bracket and the support.

FIG. 15B is an enlarged view of a bucket 14 of the weighing and bagging machine 50A or 50B having a bracket 28 coupled to a support 29 and a load cell 27 disposed intermediate the bracket 28 and the support 29. The load cell 27 generates a signal to a processor 100 (not shown in FIG. 15B—See FIG. 19). The dumping door 25 is coupled to the bucket 14 using a hinge 23. The actuator 21 is coupled intermediate the dumping door 25 and the bucket 14 to pivot the dumping door 25 between a closed position, illustrated in FIG. 15B, and an open position illustrated in FIG. 15C. A link 21A is coupled intermediate the actuator 21 and the bucket 14 and a piston rod 21B is illustrated as extending from the actuator 21 and pivotally coupled to the dumping door 25 at a pivot 21. The actuator 21 shown in FIG. 15B is in the extended configuration to retain the dumping door 25 in the closed position.

Figure 15C:
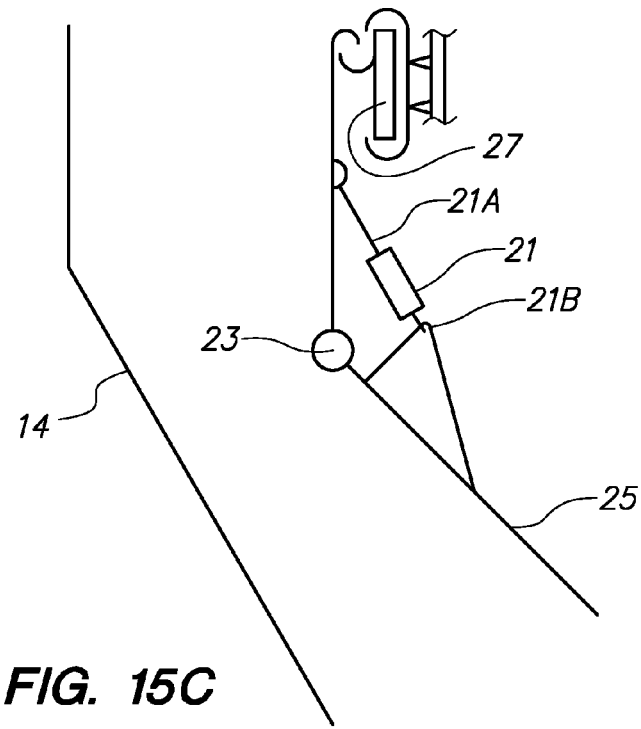
FIG. 15C is the enlarged view of the bucket of FIG. 15B after actuation of the actuator to move the dumping door to an open position.

FIG. 15C is the enlarged view of the bucket 14 of FIG. 15B after actuation of the actuator 21 to stroke the piston rod 21B and to thereby withdraw the piston rod 21B into the actuator 21 to pivot the dumping door 25 about the hinge 23 to the open position. It will be understood that any contents within the bucket 14 will be dropped from the bucket 14 as illustrated in FIG. 15A.

Figure 16:
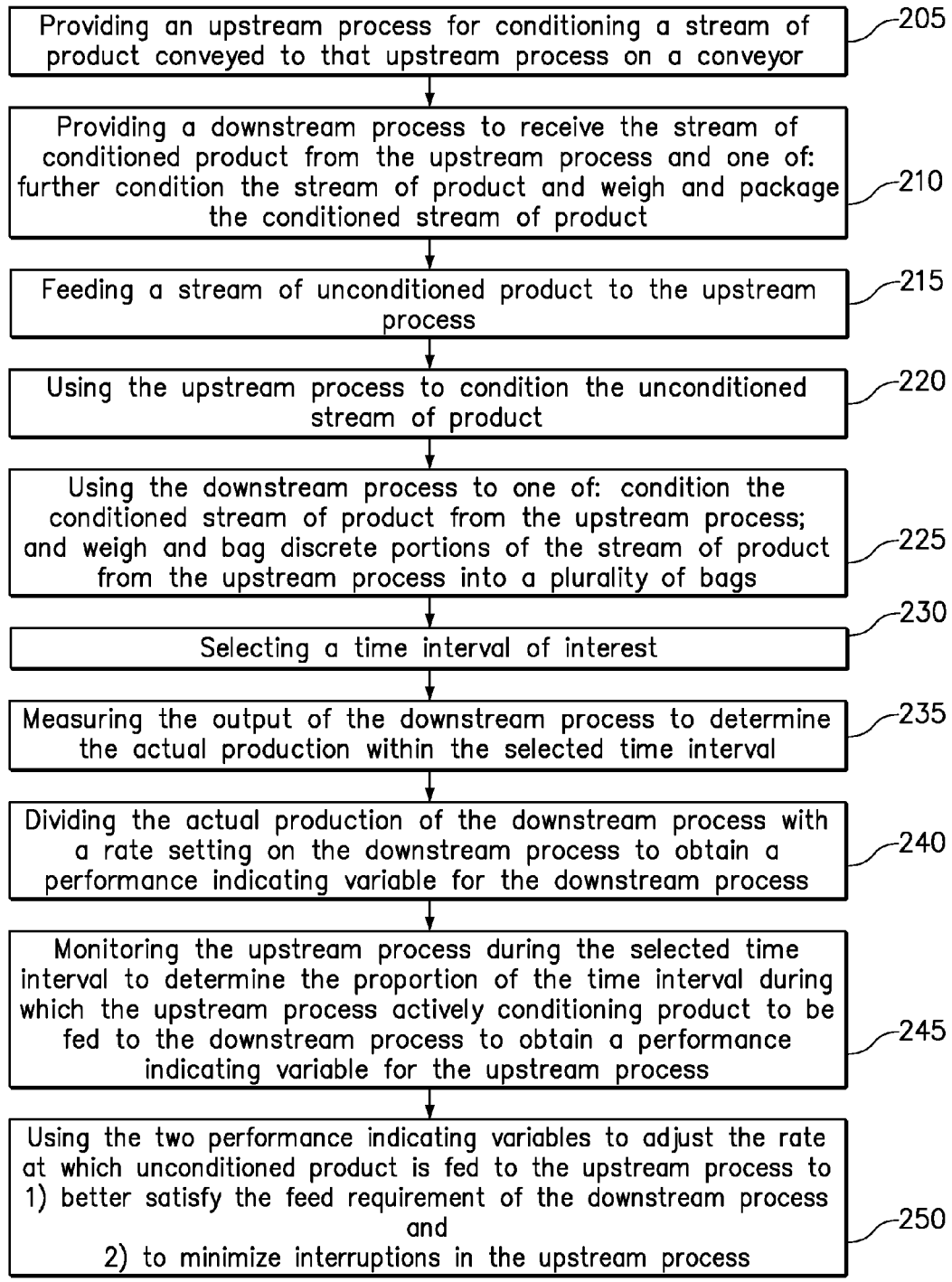
FIG. 16 is a high level flowchart illustrating the steps of an embodiment of the control method of the present invention.

FIG. 16 is a high level flowchart 200 illustrating the steps 205-250 of one embodiment of the control method of the present invention. Step 205 comprises providing an upstream process for conditioning a stream of product conveyed to that upstream process on a conveyor. Step 210 comprises providing a downstream process to receive the stream of conditioned product from the upstream process and one of: further condition the stream of product and weigh and package the conditioned stream of product. Step 215 comprises feeding a stream of unconditioned product to the upstream process. Step 220 comprises using the upstream process to condition the unconditioned stream of product. Step 225 comprises using the downstream process to one of: condition the conditioned stream of product from the upstream process; and weigh and bag discrete portions of the stream of product from the upstream process into a plurality of bags. Step 230 comprises selecting a time interval of interest. Step 235 comprises measuring the output of the downstream process to determine the actual production within the selected time interval. Step 240 comprises dividing the actual production of the downstream process with a rate setting on the downstream process to obtain a performance indicating variable for the downstream process. Step 245 comprises monitoring the upstream process during the selected time interval to determine the proportion of the time interval during which the upstream process actively conditioning product to be fed to the downstream process to obtain a performance indicating variable for the upstream process. Step 250 comprises using the two performance indicating variables to adjust the rate at which unconditioned product is fed to the upstream process to 1) better satisfy the feed requirement of the downstream process and 2) to minimize interruptions in the upstream process.

FIG. 17 is a pair of tables 306 and 307 illustrating how a processor may be used to implement an embodiment of the control method of the present invention. Table 306 indicates eight buckets 14 of a weighing and bagging machine 50A or 50B, and a weight of product (in grams) within each of the eight buckets 14. It will be understood that a processor (not shown) can rapidly compute the sum of the weight of product in any combination of two or more buckets 14, and a processor can rapidly identify those combinations that meet a predetermined range of combined weight. For example, if the desired range of weight is 25.0-25.5 grams, the processor may select bucket number 3 having a weight indicated at arrow 301 as 10.2 grams and bucket number 6 having a weight indicated at arrow 302 as 15 grams, for a combined weight of 25.2 grams, a weight that falls within the desired range. The processor may activate the actuator that opens the dumping door 25 (not shown in FIG. 17—see FIG. 15A) to dump the contents of bucket numbers 3 and 6 into a waiting bag 32.

FIG. 18 is a table 308 illustrating how a processor (not shown) used to implement an embodiment of the control method of the present invention can determine the rate at which the conditioned product is weighed and packaged in either bags per minute or kg/minute. FIG. 18 shows a recorded list of weights 311 and corresponding fill times 312 for 20 consecutive bags 32 (not shown in FIG. 18—see FIG. 15A) filled using a weighing and bagging machine 50A or 50B (see FIG. 1). The processor may be programmed to calculate, on a rolling basis, the total weight of product deposited in all bags filled within a given time interval such as, for example, 10 seconds. In FIG. 18, it can be seen that bag numbers 1-17 were filled in the first time interval 310 of 10 seconds, and the processor may sum the weights of those 17 filled bags to determine the total weight 309 of 429.36 grams. This total weight may be used in determining the $BPM_{RATIO}$ or the total number of bags filled (17 bags during the 10-second interval used as an example time interval) may be used because the average weight is known within a very limited range.

Figure 19:
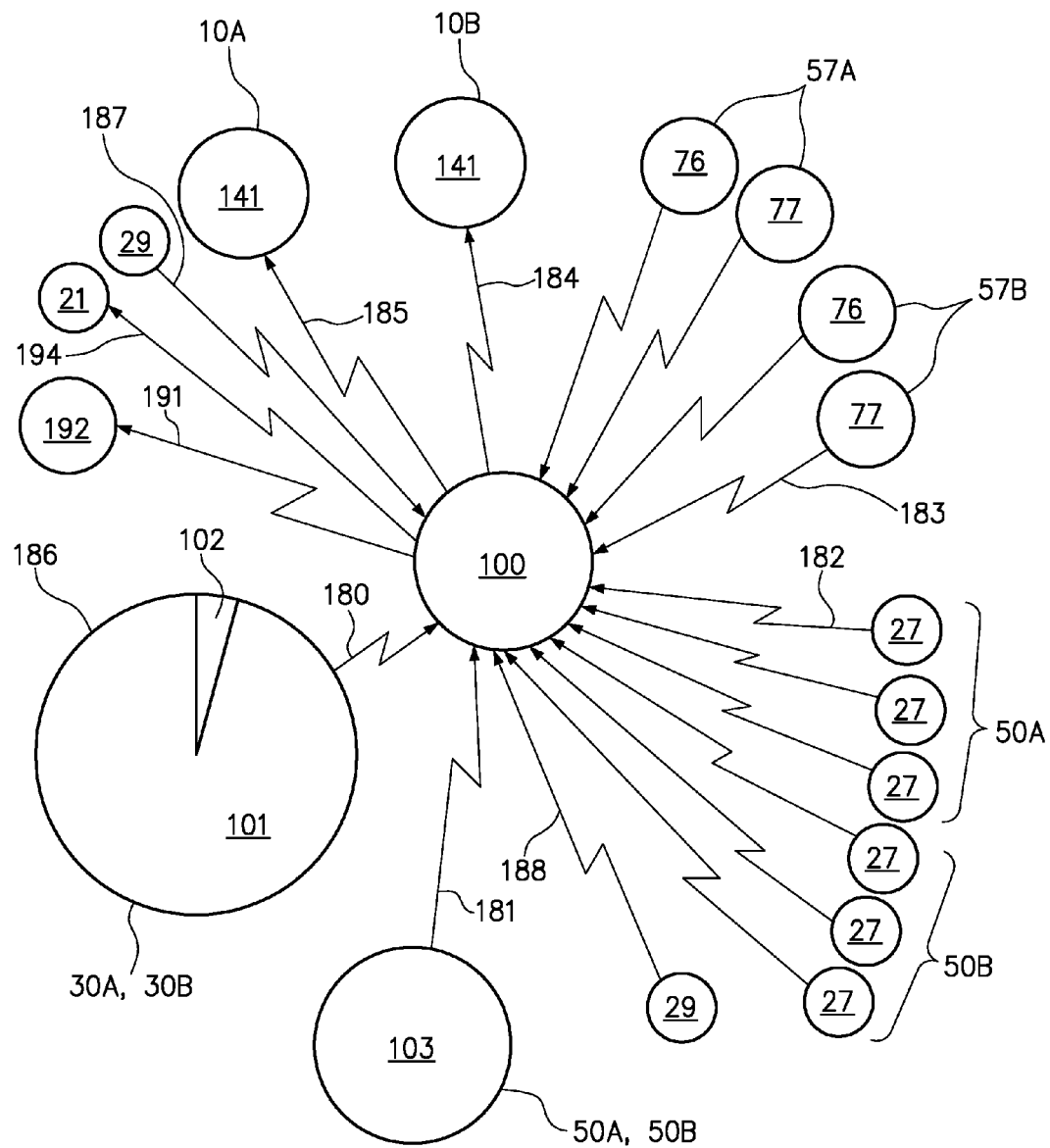
FIG. 19 is a diagram illustrating the control process and control components that may be employed to implement an embodiment of the control method of the present invention.

FIG. 19 is a diagram illustrating the control process and control components that may be employed to implement an embodiment of the control method of the present invention. FIG. 19 illustrates how a processor 100 can be used, either using hard wired connections or wirelessly, to receive a signal 180 indicating an active and operating upstream process (seasoning station) 30A or 30B, and to compare the duration of that signal 180 to a selected time interval during which the signal 180 is monitored by the processor 100. For example, if the signal 180 is received for a very large portion of the selected time interval represented by a circle, then the actual duty cycle, $DC_{ACTUAL}$, will be determined as the number of degrees of the angle 102 (representing the duration of suspended operation of the divided by the number of degrees or radians of the entire circle 186. It will be understood that the calculation may simply be in terms of seconds of activity divided by the number of seconds in the selected time interval of interest, but this concept is graphically represented by the circle 186 and the angle (for inactivity) 102. This signal 180 will determine the performance indicating variable for the upstream process (seasoning station) 30A or 30B.

Signals 182 are received by the processor 100 from the several load cells 27 coupled to weigh the buckets 14 of the weighing and bagging machines 50A or 50B. These signals 182 enable the processor to determine the actual bags per minute, $BPM_{ACTUAL}$. Signal 182 is received by the processor 100 to provide the set point, $BPM_{SP}$, at which the downstream process (weighing and bagging machine) 50A or 50B is set to operate.

Signals 183 are received by the processor 100 from the load cell pairs 76 and 77 that sense the load supported on the conveyor section 74 illustrated in FIGS. 11 and 12. It should be understood that, in place of the load cell pairs 76 and 77, the signals 183 could alternately be received from an ultrasonic sensor 81 or an optical sensor 81A illustrated in FIG. 13A or 13B, respectively. These signals 183 enable the processor 100 to more precisely control, for example, by way of control signal 184 and 185, the drive motors 141 on the flow control valves (in-line adjustable gates) 10A and 10B, respectively, that, in turn, control the duty cycle of the upstream process (seasoning station) 30A or 30B. Signal 188 is received by the processor 100 from the load cell 29 coupled to the dispersion surface 29 disposed intermediate the downstream process 50A or 50B and the associated upstream process 30A or 30B. The processor 100 may use the signal 188 (see FIG. 15A) to activate a motor 141 on adjustable gate 10A or 10B to reposition the rotatable sleeve 116 of the adjustable gate 10A or 10B and thereby moderate the duty cycle, $DC_{ACTUAL}$, of the associated upstream process 30A or 30B to prevent unwanted accumulation of conditioned product upstream of the downstream process 50A or 50B.

The processor 100 may receive signals 182 from the load cells 27 coupled to the buckets 14 of the weighing and bagging machine 50A or 50B and the processor 100 may select actuators 21 coupled to the dumping doors 25 (see FIG. 15A) of selected buckets 14 to actuate and to thereby dump product from selected buckets 14 into a bag 32. The processor 100 may then generate and send a signal 194 to the actuators 21 of the selected buckets 14 to actuate the actuators 21 to pivot the dumping doors 25 of the selected buckets 14.

The processor 100 may use the signals 186, 181, 182 and 183 in implementing the empirical equation provided above, or a variation thereof, to calculate a metric and to generate and send a corresponding control signal 184 and 185 to the motors 141 that adjust the position of the opening 119 of the rotatable sleeves 116 of the adjustable gates 10A and 10B, respectively, to adjust the positions of the openings 119 of the rotatable sleeves 116 of the in-line adjustable gates (see FIGS. 4 and 5). Immediately following the adjustment based on the calculated metric, the processor 100 may receive signal 183 to detect changes in the mass flow rate of product being delivered to the upstream process (seasoning station) 30A or 30B.

The processor 100 may receive the signal 187 from the load cell 29 coupled intermediate the dispersion surface 13 and the dispersion surface support 37 (see FIG. 15A) and the processor 100 may reposition the flow control valves 10A or 10B to modulate the flow rate of product to the dispersion surface 13.

The processor 100 may generate and send signal 191 to a warning light 192 upon determining that the sum of the $BPM_{RATIO}$ and $DC_{ACTUAL}$ are below a predetermined amount, such as 1.7. It will be understood that an audible device, such as a buzzer or clicker, or some other type of alerting device may also be used instead of a warning light to alert operators to the condition.

The empirical equation used in embodiments of the control method require the measurements of the actual bags per minute of product produced from the weighing and bagging machine, $BPM_{ACTUAL}$, which is then divided by the bags per minute set point of the weighing and bagging machine, $BPM_{SP}$, to determine the efficiency of the weighing and bagging machine, $BPM_{RATIO}$. It is also required that the actual rate at which unseasoned product enters the seasoning system, which is the actual duty cycle, $DC_{ACTUAL}$, of the seasoning system. The mass flow rate at which unseasoned product enters the seasoning system can be determined using the methods and/or devices illustrated in FIGS. 11-13B discussed above. The duty cycle, $DC_{ACTUAL}$, can be determined using a processor (not shown) having a timer programmed on it to measure the portion of a selected time interval of interest during which the seasoning system is active and operating.

As described above, the $BPM_{RATIO}$ is determined using the load cell data signals generated by the load cells 27 of the weighing and bagging machine 50A. An embodiment of the control method of the present invention uses the $BPM_{RATIO}$ and the $DC_{ACTUAL}$ to continuously or intermittently adjust the mass flow rate of the raw product discharged through a side-discharging adjustable gate 10A or 10B (see FIG. 1) to the seasoning system 30A or 30B, respectively. The control method enables the ongoing fine tuning, trimming or adjusting of the duty cycle of the seasoning system 30A or 30B by adjusting the position of the rotatable sleeve 16 of the adjustable gates 10A or 10B, respectively, to slightly overfeed the weighing and bagging machine 50A and to provide long uninterrupted periods of operation of the seasoning system 30A or 30B.

An embodiment of the control method of the present invention may be implemented using the empirical formula: Metric=$(1.0/DC_{ACTUAL}) \times (BPM_{RATIO})^2 \times (2.0/(DC_{ACTUAL} + BPM_{RATIO}))$. The empirical formula used in embodiments of the control method of the present invention uses two critical performance indicating variables obtained using sensors that monitor the performance of the weighing and bagging machine 50A or 50B and the associated seasoning system 30A and 30B to provide a metric for adjusting the associated adjustable gate 10A and 10B to thereby adjust the rate at which unseasoned product is discharged from the distribution conveyor 120 to the seasoning system 30A and 30B. Importantly, the two performance indicating variables are determined using sensors, such as the load cells 27 of the weighing and bagging machine or, in a simpler approach, the number of bags 70A or 70B produced by the weighing and bagging machine 50A or 50B during a selected time interval and of a known weight range, to provide more reliable performance data than would be obtained from the load cell sensor that monitors the force imparted by the impingement of conditioned product on the dispersion surface 13 that feeds the buckets 14 of the weighing and bagging machine 50A or 50B. A metric provided by the empirical formula of embodiments of the control method will generally correct any imbalance between the upstream and downstream processes, restore the efficiency of the weighing and bagging machine ($BPM_{RATIO}$) to or towards unity, and restore the duty cycle ($DC_{ACTUAL}$) of the seasoning system to an operating mode characterized by long, continuous periods of operation with short and infrequent periods of inactivity.

The empirical solution used in embodiments of the control method of the present invention includes three factors, each of which is a function of one of the efficiency of the downstream process, which is expressed as $BPM_{RATIO}$ in application disclosed herein, and the actual duty cycle of the upstream process, $DC_{ACTUAL}$, expressed as the percentage of a given time interval that the upstream process remains active. The empirical solution used in embodiments of the control method is biased (by the squaring of the $BPM_{RATIO}$) to maintain the output of the downstream process close to the set point. It will be understood that the inclusion in the empirical formula of a single factor (of the three) equal to the square of the $BPM_{RATIO}$ term which, when that value is less than unity, enhances the impact of that variable on the correction implemented by the method because a factor obtained by squaring a number that is less than unity will result in a lower value for the factor as compared to having a linear (non-squared) number included within the factor. This enhancement factor skews the metric towards increasing the conditioned product output of the upstream process when the performance indicating variable for the weighing and bagging machine 50A or 50B, $BPM_{ACTUAL}$, is below unity to avoid starving the downstream process.

The performance indicating variable relating to the performance of the weighing and bagging machine, $BPM_{RATIO}$, represents the bags per minute produced by the weighing and bagging machine expressed as a percentage of the rate setting on the weighing and bagging machine. Under normal operating conditions, the $BPM_{RATIO}$ can never be greater 100% because the weighing and bagging machine will never exceed the set point of the weighing and bagging machine. For this reason, we refer to the rate setting of the weighing and bagging machine as the BPM set point, or $BPM_{SP}$. The weighing and bagging machine will operate at an actual bags per minute rate, or $BPM_{ACTUAL}$, that is equal to or lower than the $BPM_{SP}$ The performance indicating factor for the weighing and bagging machine is a measure of the efficiency of the weighing and bagging machine, and is calculated as the ratio of the actual bags per minute divided by the bags per minute set point entered at the controls for the weighing and bagging machine. Stated in terms of the variables introduced here, this efficiency is expressed as $BPM_{RATIO}=BPM_{ACTUAL}/BPM_{SP}$.

It should be understood, however, that conditions relating to components of the weighing and bagging machine 50A or 50B may cause the weighing and bagging machine to consistently operate at a rate of production that is below the set point. The processor may, in some cases, be programmed to assign to the weighing and bagging machine an effective set point, $BPM_{SPEFF}$, that takes into account that the consistent impairment of the performance of the machine and the inability of the machine to operate at the actual set point, $BPM_{SP}$. In these cases, if the $BPM_{RATIO}$ is obtained by dividing the $BPM_{ACTUAL}$ by the $BP_{SPEFF}$, the resulting $BPM_{RATIO}$ can exceed unity.

When the adjustable gates 10A or 10B of the distribution conveyor 120, and the seasoning stations (upstream processes) 30A and 30B fed by the adjustable gates of the distribution conveyor, together fail to provide a sufficient product feed rate to the weighing and bagging machines 50A and 50B, the performance indicating variable, $BPM_{RATIO}$, for the weighing and bagging machine will be less than one. Ideally, the efficiency of the weighing and bagging machine, or $BPM_{ACTUAL}$, will remain very close to 1.0—stated another way, the $BPM_{ACTUAL}$ should remain very close to the $BPM_{SP}$ to maximize production.

This is a good way to view the challenge of the control method used to operate the adjustable gate of the distribution conveyor and the seasoning system that together feed product to the weighing and bagging machine. Production is maximized when the performance indicating variable, or the efficiency, $BPM_{RATIO}$, of the weighing and bagging machine is maximized, and $BPM_{RATIO}$ is maximized when the weighing and bagging machine is overfed, i.e. not starved of product to bag. Severe overfeeding, however, means that the seasoning system must be frequently stopped and restarted to prevent unwanted accumulation of seasoned product upstream of the weighing and bagging machine, an operating mode that impairs the quality of the conditioned product provided by the seasoning system to the weighing and bagging machine.

One embodiment of the present invention provides a method of controlling the rate at which an upstream product conditioning process delivers a stream of conditioned product to a downstream weighing and packaging process. The objective of embodiments of the control method of the present invention is to operate the upstream process in a manner that maximizes output by enabling the weighing and packaging process to operate at maximum capacity while, at the same time, avoiding loss of quality that can arise from frequently stopping and starting the upstream process.

Embodiments of the present invention have applications in the prepared foods industry. An embodiment of the control method of the present invention can be described in terms relating to application of the control method to the conditioning of a food product, in the upstream process, and the subsequent weighing and bagging of the food product, in the downstream process. More specifically, the upstream process is a process in which a stream of product consisting of a large plurality of individual food portions is seasoned (conditioned), and the conditioned stream of product is moved to a downstream process that disposes a predetermined amount of the conditioned product, by weight, into each of a large number of bags that are subsequently sealed. The seasoning may be applied within a predetermined range, for example, and stated in terms of percentage of weight, each bag of seasoned product may comprise from 3 to 6 percent seasoning by weight. The amount of product placed using the weighing and bagging machine into each bag may be, for example, within a range from 25 to 25.5 grams. The targeted weight is above 25 grams so that none or very few bags are below the 25 gram target.

The weighing and bagging machine receives product from a dispersion cone that includes a reservoir that feeds a dispersion surface. The reservoir receives seasoned product from the upstream process, and the dispersion surface forms a portion of the bottom of the dispersion cone that causes the dispersion cone to accumulate an amount of seasoned product and to controllably release the product onto the dispersion surface. The product released from the dispersion cone slides along the dispersion surface until it drops into one of a plurality of collectors, or buckets, arranged circumferentially about the dispersion surface to catch and to accumulate the seasoned product in the buckets. Each bucket is equipped with a dumping door and an actuator that is activatable to open and then to close the dumping door.

A load cell may be disposed on the dispersion cone to generate a signal corresponding to the weight of the seasoned product accumulated within the reservoir of the dispersion cone. A load cell is also disposed intermediate each of the plurality of buckets and the weighing and bagging machine to generate a signal corresponding to the accumulated weight of the product residing in each of the buckets. A processor receives the signals from the plurality of load cells. The processor identifies combinations of buckets in which the combined weight of the seasoned product falls within the desired range (25-25.5 grams) for a bag of product, and the processor activates the dumping doors on each bucket of the combination of buckets that together satisfy the weight range requirement. The combination of buckets are dumped into a waiting bag that is then sealed and ejected from the weighing and bagging machine.

The processor records the weights of seasoned product dumped from the buckets into each bag. Each recorded weight is paired with a time stamp. This enables the processor to determine, for any given interval of time of interest, the weight of seasoned product that was bagged during the time interval of interest. Optionally, the processor may simply record the number of times a selected combination of buckets was dumped during a time interval of interest and multiply that number by the average weight of the contents of a single bag, or about 25.25 grams, to determine the total weight of seasoned product that was bagged during the time interval of interest.

The determined rate at which seasoned product delivered to the weighing and bagging machine (downstream process) processes the products will be referred to below as $BPM_{ACTUAL}$, and may be expressed in terms of kg/minute or bags/minute. That determined $BPM_{ACTUAL}$ can be divided by the set point of the weighing and bagging machine (also in kg/minute or bags/minute) to determine a $BPM_{RATIO}$, which is the actual rate of seasoned product processed by the weighing and bagging machine divided by the set point of the machine.

The duty cycle of the seasoning process in which seasoning material is applied to a stream of product (upstream process) is determined by dividing the amount of active time during a time interval by the time interval to obtain a percentage of the time interval that the seasoning system was active. The duty cycle of the seasoning system can be determined by a processor that records the timing of each stopping and restarting of the seasoning system. With the $BPM_{RATIO}$ and the duty cycle, an embodiment of the control method of the present invention can be implemented.

Some foodstuffs consist of a large plurality of individual food portions. Examples of such foodstuffs that consist of a large plurality of individual food portions include, but are not limited to, potato chips, cookies, pretzels, nuts and hard candies. Many of these types of foodstuffs are produced at a facility and then bagged in a bagging machine at the site for subsequent transport and sale to consumers. Some of these types of foodstuffs are seasoned with flavoring materials before they are bagged.

The production of these types of foodstuffs—foodstuffs consisting of a large plurality of individual food portions—generally includes conveyors that can reliably move a stream of the foodstuffs in a controlled stream. It will be understood that the term "stream," as used herein, describes the manner in which the foodstuff is conveyed because the large plurality of individual food portions together form a continuous flow that can be moved from one place in a facility to another place in the facility using a conveyor adapted for moving the stream. Also, because the stream of the foodstuff consists of a large plurality of individual food portions, the stream can be divided into two or more streams that are to be routed to separate destinations using conveyor gates. This advantage is especially important where, for example, a large stream of the foodstuff is to be divided into two or more streams and thereafter routed to two or more different seasoning stations where two or more different seasonings or other flavoring agent is to be applied to the separated sub-streams of the foodstuff. Alternately, a large stream of the foodstuff may be divided into two or more streams and thereafter routed to two or more different weighing and bagging machines that produce bags having different target weights.

For example, but not by way of limitation, a stream of unseasoned potato chips may be moved, using a conveyor, from a portion of a facility where the potatoes are sliced into a large plurality of individual food portions and cooked in a fryer to another portion of the facility where the cooked, but yet unseasoned, potato chips are seasoned, weighed and then packaged into identical bags, each having approximately the same amount of seasoned potato chips (by weight). It will be understood that the stream of cooked and unseasoned potato chips (product) from the cooking section of the facility can be sub-divided into two or more streams to feed separate two or more separate seasoning stations that apply different seasonings. For example, a first seasoning, seasoning "A," can be applied to a stream of unseasoned potato chips discharged from a main source conveyor using a side-discharging gate that diverts a stream of product to a first seasoning station and a second seasoning, seasoning "B," can be applied to a stream of unseasoned potato chips discharged from the main source conveyor, at a location downstream of the first side-discharging gate, using a second side-discharging gate that diverts a stream of product to a second seasoning station.

A flow control valve that controls the rate at which raw product is discharged from the distribution conveyor to the receiving conveyor that feeds an upstream process such as, for example, an embodiment of a side-discharging adjustable gate disclosed in U.S. patent application Ser. No. 14/186,656 filed on 21 Feb. 2014 and entitled IN-LINE ADJUSTABLE GATE, is responsive to signals generated and transmitted from a processor. This adjustable gate can be used to control the rate at which raw product is discharged from the distribution conveyor. Alternately, flow control valves (adjustable gates) are disclosed in U.S. Pat. No. 6,119,849 and also in U.S. Pat. No. 6,378,688.

The effectiveness of embodiments of the control method of the present invention has been confirmed in a number of test cases. These test cases include scenarios where the weighing and bagging machine is starved of product (underfed) and scenarios where the weighing and bagging machine is overfed.

The first test case described below is a scenario in which the weighing and bagging machine experience normal underfeeding, which causes unwanted starving of the weighing and bagging machine and slowed performance of the weighing and bagging machine.

The manner in which an embodiment of the control method of the present invention operates to adjust the rate at which raw product is fed to the upstream process can be better understood using a series of specific examples in which the performance indicating variables are sub-optimal.

In a first example, an upstream process severely overfeeds the downstream process, meaning that the seasoning system conditions and feeds an excessive rate of conditioned product to the inlet hopper of the weighing and bagging machine. This sub-optimal performance is a problem because it results in the downstream process terminating calls for more product from the upstream process and causes excessively frequent stopping and restarting of the seasoning system to avoid unwanted accumulation of conditioned product at the inlet hopper of the weighing and bagging machine. In terms that can be used in the empirical control method, the duty cycle, $DC_{ACTUAL}$, stated in decimals, in a severely overfed mode, may be only 0.5. This means that the upstream process is inactive half of the time in order to feed only as much conditioned product to the downstream process as is needed for the weighing and bagging machine to meet its set point, $BPM_{SP}$. As a result, the first factor in the empirical formula becomes 1.0/0.5, or 2. This first factor is multiplied by the second factor, which is the square of the $BPM_{RATIO}$ term, which is unity. The product of the first factor and the second factor is multiplied by the third factor, which is 2.0/(0.50+1.0), which is 2/1.5 or 1.33. 2×1×1.33=2.66. This metric is well above 1, meaning that the adjustable gate should be, directionally and proportionally speaking, adjusted to elevate the opening 119 in the rotatable sleeve 116 and to thereby decrease the mass flow rate of the stream of product discharged from that adjustable gate 10A or 10B to feed the associated upstream process 30A or 30B, respectively. This is the normal overfeeding scenario. If performance issues with the weighing and bagging machine had caused the machine to operated slightly below the set point, for example, at a $BPM_{RATIO}$=0.96, then the metric would have been $1.0/0.5\times[0.96/1.0]^2\times[2/(0.5+0.96)]$=2.52, which is greater than 1, meaning that the corrective action is to decrease the rate at which raw product is discharged from the adjustable gate 10A or 10B of the distribution conveyor 120 and to thereby decrease the rate at which raw product flows into the upstream process (seasoning station) 30A or 30B. This will result in fewer stops and restarts of the seasoning system 30A or 30B, which will increase the duty cycle, $DC_{ACTUAL}$, of the seasoning system. It will be understood that this is a proper corrective action.

Use of the empirical equation for determining a new metric for adjustment of the adjustable gate that discharges raw product from the distribution conveyor 120 to the upstream process 30A or 30B produces surprising and unexpected results, as demonstrated by the test cases that follow.

In a first test case in which the rate of seasoned product is nearly perfect, the $BPM_{RATIO}$ is 99%, meaning that the $BPM_{ACTUAL}$ divided by the $BPM_{SP}$ is 0.99. This is a situation in which the number of bags produced and filled by the weighing and bagging machine within a given time interval is 99% of the rate at which the weighing and bagging machine is set to operate. However, in this scenario, the weighing and bagging machine is very slightly underfed, and this falls short of the preferred operating condition in which the weighing and bagging machine is not underfed and in which the seasoning system must occasionally be stopped and restarted in order to prevent unwanted accumulation of seasoned product in the dispersion surface of the weighing and bagging machine. Using the empirical equation in which the new metric to be used in adjusting the adjustable gate 10A or 10B is equal to $(1.0/DC_{ACTUAL})\times(BPM_{RATIO})^2\times(2.0/(DC_{ACTUAL}+BPM_{RATIO}))$, and we enter the values for $DC_{ACTUAL}$=1.0 and $BPM_{RATIO}$=0.99, and we obtain a metric equal to $[1.0/1.0]\times[0.99]^2\times[2.0/(1.0+0.99)]$=1×0.98×1.005=0.985, which is less than 1.0. This means that the flow rate of raw product from the distribution conveyor 120 to the upstream process (seasoning station) 30A or 30B should be increased, which is, directionally and proportionally speaking, the appropriate adjustment to the side-discharging gate to correct the underfeeding problem and restore the weighing and bagging machine to a slightly overfed mode.

In a second test case in which the rate of seasoned product is less perfect, the $BPM_{RATIO}$ is 0.97, meaning that the $BPM_{ACTUAL}$ divided by the $BPM_{SP}$ is 0.97. This is a situation in which the number of bags produced and filled by the weighing and bagging machine within a given time interval is 97% of the rate at which the weighing and bagging machine is set to operate. However, in this scenario, the weighing and bagging machine is slightly underfed, and this falls short of the preferred operating condition in which the weighing and bagging machine is not underfed and in which the seasoning system must occasionally be stopped and restarted in order to prevent unwanted accumulation of seasoned product delivered to the dispersion cone of the weighing and bagging machine. Using the empirical equation in which the new metric is equal to $(1.0/DC_{ACTUAL})\times(BPM_{RATIO})^2\times(2.0/(DC_{ACTUAL}+BPM_{RATIO}))$, we enter the values for $DC_{ACTUAL}$=100% and $BPM_{RATIO}$=0.97, and we obtain a new metric of $[1.0/1.0]\times[0.97]^2\times[2/(1.0+0.97)]$=1×0.941×1.015=0.955 which is less than 1.0, meaning that, directionally and proportionally speaking, the flow rate of raw product provided from the distribution conveyor 120 to the upstream process (seasoning station) should be increased, which is, directionally and proportionally speaking, the appropriate adjustment to the side-discharging gate to correct the underfeeding problem and to restore the weighing and bagging machine to a slightly overfed mode.

In a third test case in which the rate of seasoned product is substantially less than perfect, the $BPM_{RATIO}$ is 0.9, meaning that the $BPM_{ACTUAL}$ divided by the $BPM_{SP}$ is 0.9. This is a situation in which the number of bags produced and filled by the weighing and bagging machine within a given time interval is 90% of the rate at which the weighing and bagging machine is set to operate. However, in this scenario, the weighing and bagging machine is significantly underfed, and this falls short of the preferred operating condition in which the weighing and bagging machine is not underfed and in which the seasoning system must occasionally be stopped and restarted in order to prevent unwanted accumulation of seasoned product in the inlet hopper (dispersion cone) of the weighing and bagging machine. Using the empirical equation in which the new metric is $(1.0/DC_{ACTUAL})\times(BPM_{RATIO})^2\times(2.0/(DC_{ACTUAL}+BPM_{RATIO}))$, we enter the values for $DC_{ACTUAL}$=1.0 and $BPM_{RATIO}$=0.90, and we obtain a new metric of $[1.0/1.0]\times[0.9]^2\times[2/(1.0+0.9)]$=1×0.81×1.052=0.852, which is less than 1.0, meaning that the flow rate of raw product delivered from the distribution conveyor 120 to the seasoning station 30A or 30B should be increased, which is, directionally and proportionally speaking, the appropriate adjustment to the side-discharging gate to correct the underfeeding problem and to restore the weighing and bagging machine to a slightly overfed mode.

In summary, in can be seen that in scenarios in which the weighing and bagging machine ranges from being very slightly underfed to significantly underfed, the empirical equation provides a new metric that adjusts the side-discharging gate in a manner that causes more unseasoned product to be diverted from the main source conveyor to the seasoning system that feeds the weighing and bagging machine, and this increase in the rate at which the unseasoned product is fed to the seasoning machine will correct the underfed situation and move the weighing and bagging machine towards the desired mode of operation in which the $BPM_{RATIO}$ equals 1.0.

The fourth test case described below is a scenario in which the weighing and bagging machine experience normal overfeeding, which causes unwanted stopping and restarting of the seasoning system that feeds seasoned product to the weighing and bagging machine. This situation results in lower overall quality of the product because the portion of the stream of product in the seasoning system and the time of the stopping and restarting lacks the uniformity of seasoning application that can be obtained with continuous or nearly continuous operation of the seasoning system.

In a fourth test case in which the rate at which the seasoning system provides seasoned product to the weighing and bagging machine is very slightly above what is needed, the $BPM_{RATIO}$ is 1.0, meaning that the $BPM_{ACTUAL}$ divided by the $BPM_{SP}$ is 1.0. This is a situation in which the number of bags produced and filled by the weighing and bagging machine within a given time interval is 100% of the rate at which the weighing and bagging machine is set to operate. However, in this scenario, the weighing and bagging machine is very slightly overfed, and this falls short of the preferred operating condition in which the weighing and bagging machine operates at 100% and in which the seasoning system must occasionally be stopped and restarted in order to prevent unwanted accumulation of seasoned product in the inlet hopper (dispersion cone) of the weighing and bagging machine. Using the empirical equation, we obtain a new metric of $(1.0/DC_{ACTUAL}) \times (BPM_{RATIO})^2 \times (2/(DC_{ACTUAL} + BPM_{RATIO}))$, we enter the values for $DC_{ACTUAL} = 0.99$ and $BPM_{RATIO} = 1.0$, and we obtain a new metric calculated as $[1.0/0.99] \times [1.0]^2 \times [2/(0.99+1.0)] = 1.01 \times 1.0 \times 1.005 = 1.015$ which is greater than 1.0, meaning that, directionally and proportionally speaking, the adjustable gate 10A or 10B should be adjusted to decrease the rate at which raw product is delivered to the associated upstream process (seasoning station) 30A or 30B.

The metrics obtained in the above four test cases, it should be noted, have been 0.985 (in the first test case), 0.955 (in the second test case), 0.852 (in the third test case) and 1.015 (in the fourth test case). Above, we discuss the directional and proportional indication of the metric obtained. In other words, in the first test case, the metric of 0.985 means that the adjustable gate 10A or 10B should be adjusted to increase the rate at which raw product is fed to the associated upstream process (seasoning station) 30A or 30B. The second and the third test cases also produced metrics that indicate that the adjustable gate 10A or 10B should be adjusted to increase the mass flow rate of product, with only the fourth test case indicating a need to reduce the flow rate. It should be understood that the magnitude by which the metric differs from unity, in addition to the condition of being less than or greater than unity, should be used to determine the amount of the adjustment that should occur in the direction of the adjustment indicated by the comparison to unity. For example, but not by way of limitation, the first test case with a metric of 0.985 indicates that the adjustable gate 10A or 10B should be adjusted to increase the rate at which raw product is delivered to the associated upstream process (seasoning station) 30A or 30B, but not by as much as is needed in the second and third test cases, which have metrics of 0.955 and 0.852 and differs from unity by increasing amounts relative to the first test case. Thus the metric provided by the empirical equation indicates not only the direction, but also the proportion of the adjustment that is needed.

In a fifth test case in which the rate at which the seasoning system provides seasoned product to the weighing and bagging machine is slightly above what is needed, the $BPM_{RATIO}$ is 1.0, meaning that the $BPM_{ACTUAL}$ divided by the $BPM_{SP}$ is 1.0. This is a situation in which the number of bags produced and filled by the weighing and bagging machine within a given time interval is 1.0 of the rate at which the weighing and bagging machine is set to operate. However, in this scenario, the weighing and bagging machine is slightly overfed, and this falls short of the preferred operating condition in which the weighing and bagging machine operates at 1.0 and in which the seasoning system must occasionally be stopped and restarted in order to prevent unwanted accumulation of seasoned product in the inlet hopper (dispersion cone) of the weighing and bagging machine. Using the empirical equation, the new metric $(1.0/DC_{ACTUAL}) \times (BPM_{RATIO})^2 \times (2/(DC_{ACTUAL} + BPM_{RATIO}))$, we enter the values for $DC_{ACTUAL} = 0.9$ and $BPM_{RATIO} = 1.0$, and we obtain a metric of $[1.0/0.9] \times [1.0]^2 \times [2/(0.9+1.0)] = 1.11 \times 1.0 \times 1.053 = 1.168$, which is greater than 1.0, meaning that the adjustment of the adjustable gate 10A or 10B should be adjusted to decrease the rate at which raw product is delivered to the associated upstream process (seasoning station) 30A or 30B. When a metric is greater than 1.0, the flow rate of product to the seasoning system is decreased, which is, directionally and proportionally speaking, the appropriate adjustment to the side-discharging gate to correct the overfed situation and restore the seasoning system to a throughput rate that results in a slightly overfed situation at the weighing and bagging machine. It should also be noted that the magnitude of the decrease is moderate, as the metric exceeds 1.0, but only by 0.168.

In a sixth test case in which the rate at which the seasoning system provides seasoned product to the weighing and bagging machine is slightly above what is needed, the $BPM_{RATIO}$ is 1.0, meaning that the $BPM_{ACTUAL}$ divided by the $BPM_{SP}$ is 1.0. This is a situation in which the number of bags produced and filled by the weighing and bagging machine within a given time interval is 100% of the rate at which the weighing and bagging machine is set to operate. However, in this scenario, the weighing and bagging machine is significantly overfed, and this falls short of the preferred operating condition in which the weighing and bagging machine operates at 1.0 and in which the seasoning system must occasionally be stopped and restarted in order to prevent unwanted accumulation of seasoned product in the inlet hopper (dispersion cone) of the weighing and bagging machine. Using the empirical equation in which the new metric $(1.0/DC_{ACTUAL}) \times (BPM_{RATIO})^2 \times (2.0/(DC_{ACTUAL} + BPM_{RATIO}))$, we enter the values for $DC_{ACTUAL} = 0.8$ and $BPM_{RATIO} = 1.0$, and we obtain a new metric of $[1.0/0.8] \times [1.0]^2 \times [2/(0.80+1.0)] = 1.25 \times 1.0 \times 1.111 = 1.389$, which is substantially greater than 1.0, meaning that the adjustable gate 10A or 10B should be adjusted to substantially decrease the rate at which raw product is delivered to the associated upstream process (seasoning station). When a metric is greater than 1.0, the flow rate of product to the seasoning system is decreased, which is, directionally and proportionally speaking, the appropriate adjustment to the side-discharging gate to correct the overfed situation and restore the seasoning system to a throughput rate that results in a significantly overfed situation at the weighing and bagging machine.

In a seventh test case in which the rate at which the seasoning system provides seasoned product to the weighing and bagging machine is slightly above what is needed, the $BPM_{RATIO}$ is 1.0, meaning that the $BPM_{ACTUAL}$ divided by the $BPM_{SP}$ is 1.0. This is a situation in which the number of bags produced and filled by the weighing and bagging machine within a given time interval is 100% of the rate at which the weighing and bagging machine is set to operate. However, in this scenario, the weighing and bagging machine is severely overfed, and this falls short of the preferred operating condition in which the weighing and bagging machine operates at 100% and in which the seasoning system must occasionally be stopped and restarted in order to prevent unwanted accumulation of seasoned product in the inlet hopper (dispersion cone) of the weighing and bagging machine. Using the empirical equation in which the new metric of $(1.0/DC_{ACTUAL}) \times (BPM_{RATIO})^2 \times (2.0/(DC_{ACTUAL} + BPM_{RATIO}))$, we enter the values for $DC_{ACTUAL} = 0.5$ and $BPM_{RATIO} = 1.0$, and we obtain a new metric of $[1.0/0.50] \times [1.0]^2 \times [2/(0.50+1.0)] = 2.0 \times 1.0 \times 1.33 = 2.67$, which is substantially greater than 1.0, meaning that the adjustable gate 10A or 10B should be adjusted to substantially decrease the rate at which raw product is delivered to the associated upstream process (seasoning station) 30A or 30B. When a metric is substantially greater than 1.0, the flow rate of product to the seasoning system needs to be substantially decreased.

In an eighth test case in which the rate at which the upstream process, the seasoning system, provides conditioned (seasoned) product to the downstream process, the weighing and bagging machine, at a rate that is above what is needed by the downstream process, but in which the weighing and bagging machine is not operating at or near full capacity due to bad bagger performance or poor settings on the controls of the weighing and bagging machine, the $BPM_{RATIO}$ is 0.8, meaning that the $BPM_{ACTUAL}$ divided by the $BPM_{SP}$ is 0.85. Before further discussion of this eighth test case, it should be stated that the empirical equation is adapted to be self-limiting; that is, it finds the equilibrium point where $DC_{ACTUAL}$ and $BPM_{RATIO}$ are equal, the point at which the empirical equation produces a metric that is equal to unity, and it holds those settings until such time that it detects that the equilibrium is lost, and then it begins cyclically sensing the $BPM_{RATIO}$ and the $DC_{ACTUAL}$, and determining and implementing new metrics to control the system (the upstream and downstream processes) and to guide the upstream process and the downstream process back into equilibrium. In this eighth test case in which both the $BPM_{RATIO}$ and the $DC_{ACTUAL}$ are both less than unity, the empirical equation will move the system in the wrong direction but, as will be observed, the directionally improper correction is self-limited by resulting in subsequent $DC_{ACTUAL}$ values going no lower than the $BPM_{RATIO}$ value.

The eighth test case is a situation in which the number of bags actually produced and filled by the weighing and bagging machine within a given time interval is 80% of the rate (set point) at which the weighing and bagging machine is set to operate. However, in this scenario, the weighing and bagging machine is functionally overfed, as evidenced by the $DC_{ACTUAL}$ being as low as 0.85, and this condition falls short of the preferred operating condition in which the weighing and bagging machine operates at 100% of capacity ($BPM_{SP}$) and in which the seasoning system must only infrequently be stopped and restarted in order to prevent unwanted accumulation of seasoned product delivered to the dispersion surface of the downstream process, the weighing and bagging machine. Using the empirical equation, we obtain a new metric equal to $(1.0/DC_{ACTUAL}) \times (BPM_{RATIO})^2 \times (2.0/(DC_{ACTUAL}+BPM_{RATIO}))$, we enter the values for $DC_{ACTUAL}=0.85$ and $BPM_{RATIO}=0.80$, and we obtain a new metric of $[1.0/0.85] \times [0.80]^2 \times [2/(0.85+0.80)]=1.18 \times 0.64 \times 1.212=0.91$, which is less than 1.0, indicating that the adjustable gate 10A or 10B should be adjusted to increase the rate at which the raw product is discharged from the distribution conveyor 120 to the upstream process (seasoning station) 30A or 30B. However, increasing the rate at which raw product is discharged to the upstream process will serve to drive the duty cycle, $DC_{ACTUAL}$, downwardly from its present 0.85, and this correction, it will be recognized, is in the wrong direction; that is, increasing the rate at which raw product is delivered to the upstream process when the downstream process is already overfed will serve only to further exacerbate the overfeeding problem. It will be understood that the next $DC_{ACTUAL}$ detected by the processor will be lower than the 0.85 such as, for example, 0.80. If the $BPM_{RATIO}$ is assumed to remain at 0.8, these new values for $DC_{ACTUAL}$ and $BPM_{RATIO}$ of 0.85 and 0.8, respectively, will yield a new metric equal to $(1.0/DC_{ACTUAL}) \times (BPM_{RATIO})^2 \times (2.0/(DC_{ACTUAL}+BPM_{RATIO}))$, we enter the values for $DC_{ACTUAL}=0.80$ and $BPM_{RATIO}=0.80$, and we obtain a new metric of $[1.0/0.80] \times [0.80]^2 \times [2/(0.80+0.80)]=1.25 \times 0.64 \times 1.25=1.0$, which is unity, indicating that the adjustable gate 10A or 10B need not be adjusted, and that the present rate at which the raw product is discharged from the distribution conveyor 120 to the upstream process (seasoning station) 30A or 30B will maintain harmony between the downstream process, which is experiencing performance problems, and the upstream process, which has been adjusted by the embodiment of the control method of the present invention to feed conditioned product to the downstream process at a new rate that restores the preferred operating mode—infrequent and short periods of interrupted operation which maintains product quality.

The empirical formula used in the manner demonstrated by the test cases described and discussed above may also be implemented with computer instructions to illuminate a signal that will alert operation personnel when the sum of $DC_{ACTUAL}$ plus the $BPM_{RATIO}$ falls significantly below 2.0 such as, for example, 1.7. This is the situation in the eighth test case given above in which the initial sum of $DC_{ACTUAL}$ and $BPM_{RATIO}$ is 1.60. This condition occurs when both of the $DC_{ACTUAL}$ and the $BPM_{RATIO}$ are each significantly below 1.0, and here, for example, the $DC_{ACTUAL}$ is 0.80 and $BPM_{RATIO}$ is 0.80. The automatically activated alert indicates to the operations personnel that the weighing and bagging machine settings should be checked and adjusted and/or the weighing and bagging machine requires cleaning and/or repair. What about when the $BPM_{RATIO}$ is well below 1.0 not because of underfeeding but because of poor bagger performance or poor settings of the weighing and bagging machine.

In a ninth test case, the processor is programmed by the operator to assign to the weighing and bagging machine, when certain conditions are met, an effective set point, $BPM_{SPEFF}$, which is less than the $BPM_{SP}$ of the downstream process. This is beneficial in that the output of the downstream process can be reduced and controlled using the embodiments of the control method of the present invention without requiring a change to the rate of the downstream process, $BPM_{SP}$. In these cases, the effective $BPM_{RATIO}$, or $BPM_{RATIOEFF}$, is obtained by dividing the actual bags per minute produced, $BPM_{ACTUAL}$, by the effective bags per minute, $BPM_{SPEFF}$, and the resulting $BPM_{RATIOEFF}$ can, unlike the nominal $BPM_{RATIO}$, exceed unity. In this ninth test case, in which the rate at which the upstream process (seasoning system) provides conditioned (seasoned) product to the weighing and bagging machine is slightly above the effective set point, the $BPM_{RATIO}$ may be, for example, 1.10, meaning that the number of bags of product produced by the weighing and bagging machine within a given time interval is 110% of the effective set point rate, $BPM_{SPEFF}$, and, by definition, below the rate at which the weighing and bagging machine is set to operate, $BPM_{SP}$.

In this scenario, the downstream process, the weighing and bagging machine, is underfed relative to its capability, $BPM_{SP}$, and overfed relative to the effective set point, $BPM_{SPEFF}$. This condition falls short of the preferred operating condition in which the downstream process (weighing and bagging machine) operates at 100% of the effective set point assigned by the processor, $BPM_{SPEFF}$. Since the downstream process is being underfed relative to $BPM_{SP}$, the upstream process will never be interrupted and $DC_{ACTUAL}$ is 1.0. Using the empirical equation, we obtain a new metric of $(1.0/DC_{ACTUAL}) \times (BPM_{RATIO})^2 \times (2/(DC_{ACTUAL}+BPM_{RATIO}))$, we enter the values for $DC_{ACTUAL}=1.0$ and $BPM_{RATIO}=1.1$, and we obtain a new metric calculated as $[1.0/1.0] \times [1.1]^2 \times [2/(1.0+1.1)]=1.0 \times 1.21 \times 0.952=1.152$, which is greater than 1.0, meaning that, directionally and proportionally speaking, the adjustable gate 10A or 10B should be adjusted to decrease the rate at which raw product is delivered to the associated upstream process (seasoning station) 30A or 30B. Using the results of the empirical equation, subsequent values of $BPM_{RATIO}$ will reflect a lower feed rate into the downstream process until the resulting metric achieves unity. In that condition, the preferred operating condition in which the downstream process (weighing and bagging machine) operates at 100% of the effective set point assigned in the processor, $BPM_{SPEFF}$, will have been achieved via an underfeeding scenario relative to the bags per minute set point, $BPM_{SP}$.

It will be understood that in the discussion above, the generic system that can be controlled using embodiments of the control method of the present invention includes an upstream process and a downstream process. The upstream process receives a stream of product from a distribution conveyor and through a flow control valve. The upstream process conditions the stream of product and delivers the conditioned stream of product to a downstream process that either further conditions the stream of product or weighs and bags the conditioned stream of product into discrete amounts. Many example scenarios and test cases have been given in which the specific application of embodiments of the control method of the present invention includes a seasoning station as the upstream process, a weighing and bagging machine as the downstream process and a foodstuff as the stream of product. Due to the need to divide the stream of conditioned product into discrete amounts, the foodstuff consists of a large plurality of individual food portions. It will be understood that the scope of the control method of the present invention is not limited by the examples and test cases described herein, and that the specific applications described herein are selected to demonstrate the several modes and benefits of the control method of the present invention. The scope of the present invention is limited only by the appended claims.

These automatic alerts, as well as the normal operating course of embodiments of the control method of the present invention, can be implemented using a computer having a processor. The computer program products that may be used to implement embodiments of the control method of the present invention may further include computer readable program code for implementing or initiating any one or more aspects of the control methods described herein. Accordingly, a separate description of the methods will not be duplicated in the context of a computer program product.

The foregoing computer program products may further include computer readable program code for implementing or initiating any one or more aspects of the methods described herein. Accordingly, a separate description of the methods will not be duplicated in the context of a computer program product.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A control method, comprising:

using a distribution conveyor to move a stream of product consisting of a plurality of individual portions;

providing an actuated flow control valve to selectively discharge from the distribution conveyor a fraction of the stream of products;

providing one or more receiving conveyors to receive the fraction of the stream of product discharged from the distribution conveyor by the flow control valve;

providing within the one or more receiving conveyors include a section for measuring the mass flow rate at which product is discharged from the distribution conveyor to the receiving conveyor;

providing an upstream process, fed by one of the one or more receiving conveyors, to condition the fraction of the stream of product conveyed through the upstream process;

providing a downstream process fed by the upstream process to one of 1) further condition the fraction of the stream of products conditioned in and delivered to the downstream process from the upstream process, and 2) weigh and package a plurality of discrete amounts of the fraction of the stream of product into a plurality of packages, each package containing a predetermined weight amount of the product;

providing a dispersion surface intermediate the downstream process and the upstream process;

providing a load cell coupled to the dispersion surface to detect a mass flow rate at which the portion of the stream of product is received from the upstream process to the downstream process;

providing one or more load cells in the downstream process to detect the weight of the product processed by the downstream process within a given time interval;

providing a processor with a timer function;

providing a controller to regulate the rate at which the downstream process produces packaged product;

entering a set point into the controller coupled to the downstream process to regulate the rate at which the downstream process will produce packaged product;

sensing with the one or more load cells in the downstream process the weight of product packaged;

using the one or more load cells to generate one or more signals, corresponding to the weight of packaged product, to the processor;

sensing the force applied to the dispersion surface by product delivered from the upstream process to the downstream process;

using the load cell coupled to the dispersion surface to generate a signal corresponding to the sensed force applied to the dispersion surface;

using the processor to receive the signal from the load cell coupled to the dispersion surface;

using the processor to close the flow control valve to prevent unwanted accumulation of product intermediate the upstream process and the downstream process;

using the processor to correlate the force applied by product interaction with the dispersion surface to a rate of product delivery from the upstream process to the downstream process;

using the processor to determine a performance indicating variable ratio of the actual rate of product packaged by the downstream process to the set point;
selecting a time interval of interest;
using the processor to determine a performance indicating variable ratio of the time interval during which the upstream process is active to the duration of the time interval;
use the processor to determine a metric equal to a product of a first factor times a second factor times a third factor, wherein the first factor is 1.0 divided by the performance indicating variable ratio of the time interval during which the upstream process is active to the duration of the time interval, wherein the second factor is the square of the performance indicating variable ratio of the actual rate of product packaged by the downstream process to the set point, and the third factor is 2.0 divided by the sum of the performance indicating variable ratio of the time interval during which the upstream process is active to the duration of the time interval and the performance indicating variable ratio of the actual rate of product packaged by the downstream process to the set point;
use the processor to compare the metric to 1.0;
use the processor to generate a signal to the actuated flow control valve to one of (i) leave the actuated flow control valve in the present position upon finding that the metric is equal to 1.0, (ii) open the flow control valve to increase the rate at which product is discharged from the distribution conveyor to the receiving conveyor upon finding that the metric is less than 1.0, and (iii) close the flow control valve to decrease the rate at which product is discharged from the distribution conveyor to the receiving conveyor upon finding that the metric is greater than 1.0;
using the processor, the one or more load cells in the downstream process, the load cell coupled to the dispersion surface and the time function to generate a new metric corresponding to updated performance of the upstream process and the downstream process; and
repeating the steps of comparing the new metric to 1.0 and adjusting the actuated flow control valve.

2. The control method of claim 1, wherein the flow control valve is an adjustable gate.

3. The control method of claim 2, wherein the adjustable gate comprises a rotatable sleeve having an opening that is positionable using a drive motor responsive to a signal from a processor.

4. The control method of claim 1, wherein providing within the receiving conveyor a section for measuring the mass flow rate at which product is discharged from the distribution conveyor to the receiving conveyor comprises:
providing a plurality of load cells intermediate the section of the receiving conveyor and one or more adjacent supporting sections of the receiving conveyor to measure the rate at which product is received from the distribution conveyor to the upstream process.

5. The control method of claim 1, wherein providing within the receiving conveyor a section for measuring the mass flow rate at which product is discharged from the distribution conveyor to the receiving conveyor comprises:
providing an optical sensor to detect a level at which the product within the receiving conveyor interfaces with one or more walls of the receiving conveyor; and
using the detected wall interface to obtain a mass flow rate from a look-up table to empirically determine the mass flow rate at which product is received from the distribution conveyor to the upstream process.

6. The control method of claim 1, wherein providing within the receiving conveyor a section for measuring the mass flow rate at which product is discharged from the distribution conveyor to the receiving conveyor comprises:
providing an ultrasonic sensor to detect a height interface of the product within the receiving conveyor; and
using the detected height interface to obtain a mass flow rate from a look-up table to empirically determine the mass flow rate at which product is received from the distribution conveyor to the upstream process.

7. The control method of claim 1, wherein the distribution conveyor is a reciprocating conveyor; and
wherein the one or more receiving conveyors are reciprocating conveyors.

8. A control method, comprising:
using a distribution conveyor to move a stream of a food product consisting of a plurality of individual food portions;
providing an actuated flow control valve to selectively discharge from the distribution conveyor a fraction of the stream of a food product;
providing a receiving conveyor to receive the fraction of the stream of food product discharged from the distribution conveyor by the flow control valve;
providing within the receiving conveyor a section for measuring the mass flow rate at which the food product is discharged from the distribution conveyor to the receiving conveyor;
providing a seasoning station to apply a seasoning material the fraction of the stream of food product conveyed through the seasoning station;
providing a weighing and bagging machine to weigh and package a plurality of discrete amounts of the fraction of the stream of food product into a plurality of packages of equal weight of the seasoned food product;
providing a dispersion surface intermediate the weighing and bagging machine and the seasoning station;
providing a load cell coupled to the dispersion surface to detect a mass flow rate at which the fraction of the stream of food product is received from the seasoning station to the weighing and bagging machine;
providing one or more load cells in the weighing and bagging machine to detect the weight of the food product processed by the weighing and bagging machine within a given time interval;
providing a processor with a timer function; providing a controller to regulate the rate at which the weighing and bagging machine produces bags of the food product at the predetermined weight;
entering a set-point into the controller coupled to the weighing and bagging machine to regulate the rate at which the weighing and bagging machine will produce packaged product;
sensing with the one or more load cells in the weighing and bagging machine the weight of the food product bagged;
using the one or more load cells to generate one or more signals, corresponding to the weight of food product bagged by the weighing and bagging machine, to the processor;
sensing the force applied to the dispersion surface by product delivered from the seasoning station to the weighing and bagging machine;

using the load cell coupled to the dispersion surface to generate a signal corresponding to the sensed force applied to the dispersion surface;
using the processor to receive the signal from the load cell coupled to the dispersion surface;
using the processor to temporarily suspend operation of the seasoning station to prevent unwanted accumulation of product intermediate the seasoning station and the weighing and bagging machine;
using the processor to correlate the force applied by product interaction with the dispersion surface to a rate of product delivery from the seasoning station to the weighing and bagging machine;
using the processor to determine a performance indicating variable ratio of the actual rate of product packaged by the weighing and bagging machine to the set point;
selecting a time interval of interest;
using the processor to determine a performance indicating variable ratio of the time interval during which the seasoning station is active to the duration of the time interval of interest;
use the processor to determine a metric equal to a product of a first factor times a second factor times a third factor, wherein the first factor is 1.0 divided by the performance indicating variable ratio of the time interval during which the seasoning station is active to the duration of the time interval, wherein the second factor is the square of the performance indicating variable ratio of the actual rate of product packaged by the weighing and bagging machine to the set point, and the third factor is 2.0 divided by the sum of the performance indicating variable ratio of the time interval during which the seasoning station is active to the duration of the time interval and the performance indicating variable ratio of the actual rate of product packaged by the weighing and bagging machine to the set point;
use the processor to compare the metric to 1.0;
use the processor to generate a signal to the actuated flow control valve to one of (i) leave the actuated flow control valve in the present position upon finding that the metric is equal to 1.0, (ii) move the flow control valve towards a fully open position to increase the rate at which product is discharged from the distribution conveyor to the receiving conveyor upon finding that the metric is less than 1.0, and (iii) move the flow control valve towards a fully closed position to decrease the rate at which product is discharged from the distribution conveyor to the receiving conveyor upon finding that the metric is greater than 1.0;
using the processor, the one or more load cells in the weighing and bagging machine, the load cell coupled to the dispersion surface and the time function to generate a new metric corresponding to updated performance of the seasoning station and the weighing and bagging machine; and
repeating the steps of comparing the new metric to 1.0 and adjusting the actuated flow control valve.

9. The control method of claim 8, wherein the flow control valve is an adjustable gate.

10. The control method of claim 9, wherein the adjustable gate comprises a rotatable sleeve having an opening that is positionable using a drive motor responsive to a signal from a processor.

11. The control method of claim 8, wherein providing within the receiving conveyor a section for measuring the mass flow rate at which the food product is discharged from the distribution conveyor to the receiving conveyor comprises:
providing a plurality of load cells intermediate the section of the receiving conveyor and one or more adjacent supporting sections of the receiving conveyor to measure the rate at which product is received from the distribution conveyor to the seasoning station.

12. The control method of claim 8, wherein providing within the receiving conveyor a section for measuring the mass flow rate at which the food product is discharged from the distribution conveyor to the receiving conveyor comprises:
providing an optical sensor to detect a level at which the product within the receiving conveyor interfaces with one or more walls of the receiving conveyor; and
using the detected wall interface to obtain a mass flow rate from a look-up table to empirically determine the mass flow rate at which product is received from the distribution conveyor to the seasoning station.

13. The control method of claim 8, wherein providing within the receiving conveyor a section for measuring the mass flow rate at which the food product is discharged from the distribution conveyor to the receiving conveyor comprises:
providing an ultrasonic sensor to detect a height interface of the product within the receiving conveyor; and
using the detected height interface to obtain a mass flow rate from a look-up table to empirically determine the mass flow rate at which the food product is received from the distribution conveyor to the seasoning station.

14. The control method of claim 8, wherein the distribution conveyor is a reciprocating conveyor; and
wherein the one or more receiving conveyors are reciprocating conveyors.

15. A computer program product for controlling an upstream process that conditions product and feeds conditioned product to a downstream process, the computer program product comprising a non-transitory computer readable storage medium having program instructions embodied therewith, the program instructions executable by a processor to cause the processor to perform a method comprising:
using a distribution conveyor to move a stream of product consisting of a plurality of individual portions;
providing an actuated flow control valve to selectively discharge from the distribution conveyor a fraction of the stream of products;
providing one or more receiving conveyors to receive the fraction of the stream of product discharged from the distribution conveyor by the flow control valve;
providing within the one or more receiving conveyors include a section for measuring the mass flow rate at which product is discharged from the distribution conveyor to the receiving conveyor; providing an upstream process, fed by one of the one or more receiving conveyors, to condition the fraction of the stream of product conveyed through the upstream process;
providing a downstream process fed by the upstream process to one of 1) further condition the fraction of the stream of products conditioned in and delivered to the downstream process from the upstream process, and 2) weigh and package a plurality of discrete amounts of the fraction of the stream of product into a plurality of packages, each package containing a predetermined weight amount of the product; providing a dispersion surface intermediate the downstream process and the upstream process;

providing a load cell coupled to the dispersion surface to detect a mass flow rate at which the portion of the stream of product is received from the upstream process to the downstream process; providing one or more load cells in the downstream process to detect the weight of the product processed by the downstream process within a given time interval;

providing a processor with a timer function; providing a controller to regulate the rate at which the downstream process produces packaged product;

computer program product code for receiving a set point entered into the controller coupled to the downstream process to regulate the rate at which the downstream process will produce packaged product;

computer program product code for receiving one or more signals from one or more load cells in the downstream process corresponding to the weight of product packaged;

computer program product code for receiving from the one or more load cells one or more generated signals, corresponding to the weight of packaged product, to the processor;

computer program product code for sensing the force applied to the dispersion surface by product delivered from the upstream process to the downstream process;

computer program product code for receiving from the load cell coupled to the dispersion surface a signal corresponding to corresponding to the sensed force applied by the product impinging on the dispersion surface;

computer program product code for receiving the signal from the load cell coupled to the dispersion surface;

computer program product code for generating a signal to actuate a drive motor of the flow control valve to close the flow control valve to prevent unwanted accumulation of product intermediate the upstream process and the downstream process;

computer program product code to correlate the signal corresponding to the force applied by impingement of the product on the dispersion surface to a rate of product delivery from the upstream process to the downstream process;

computer program product code for determining a performance indicating variable ratio of the actual rate of product packaged by the downstream process to the set point;

computer program product code for one of selecting a time interval of interest and receiving a time interval of interest input on a user input device;

computer program product code for determining a performance indicating variable ratio of the time interval during which the upstream process is active to the duration of the time interval;

computer program product code for determining a metric equal to a product of a first factor times a second factor times a third factor, wherein the first factor is 1.0 divided by the performance indicating variable ratio of the time interval during which the upstream process is active to the duration of the time interval, wherein the second factor is the square of the performance indicating variable ratio of the actual rate of product packaged by the downstream process to the set point, and the third factor is 2.0 divided by the sum of the performance indicating variable ratio of the time interval during which the upstream process is active to the duration of the time interval and the performance indicating variable ratio of the actual rate of product packaged by the downstream process to the set point;

computer program product code for comparing the metric to 1.0;

computer program product code for generating a signal to the actuated flow control valve to one of (i) leave the actuated flow control valve in the present position upon finding that the metric is equal to 1.0, (ii) actuating a drive motor to open the flow control valve to increase the rate at which product is discharged from the distribution conveyor to the receiving conveyor upon finding that the metric is less than 1.0, and (iii) actuating the drive motor to close the flow control valve to decrease the rate at which product is discharged from the distribution conveyor to the receiving conveyor upon finding that the metric is greater than 1.0;

computer program product code for generating a new metric corresponding to updated performance of the upstream process and the downstream process; and computer program product code for repeating the steps of comparing the new metric to 1.0 and adjusting the actuated flow control valve.

\* \* \* \* \*